United States Patent
Beall et al.

(10) Patent No.: US 11,012,563 B1
(45) Date of Patent: May 18, 2021

(54) CALLING CONTACTS USING A WIRELESS HANDHELD COMPUTING DEVICE IN COMBINATION WITH A COMMUNICATION LINK ESTABLISHMENT AND MANAGEMENT SYSTEM

(71) Applicant: ConnectAndSell, Inc., Los Gatos, CA (US)

(72) Inventors: Christopher W. Beall, Reno, NV (US); Dhruv H. Shah, Saratoga, CA (US)

(73) Assignee: ConnectAndSell, Inc., Los Gatos, CA (US)

( * ) Notice: Subject to any disclaimer, the term of this patent is extended or adjusted under 35 U.S.C. 154(b) by 0 days.

(21) Appl. No.: 16/254,123

(22) Filed: Jan. 22, 2019

Related U.S. Application Data

(63) Continuation-in-part of application No. 14/857,546, filed on Sep. 17, 2015, now Pat. No. 10,432,788, which is a continuation-in-part of application No. 14/161,339, filed on Jan. 22, 2014, now Pat. No. 8,948,372, which is a continuation-in-part of application No. 13/894,126, filed on May 14, 2013, now Pat. No. 9,876,886, which is a continuation-in-part of application No. 13/412,715, filed on Mar. 6, 2012, now Pat. No. 9,986,076.

(60) Provisional application No. 62/051,947, filed on Sep. 17, 2014, provisional application No. 61/756,295, filed on Jan. 24, 2013, provisional application No. 61/646,486, filed on May 14, 2012.

(51) Int. Cl.
*H04M 3/51* (2006.01)
*H04M 3/42* (2006.01)
*H04M 1/72469* (2021.01)

(52) U.S. Cl.
CPC ..... *H04M 3/5158* (2013.01); *H04M 1/72469* (2021.01); *H04M 3/42093* (2013.01); *H04M 3/5183* (2013.01); *H04M 2203/558* (2013.01); *H04M 2250/68* (2013.01)

(58) Field of Classification Search
CPC .......... H04M 3/5158; H04M 1/72583; H04M 3/42093; H04M 3/5183
USPC .................................................. 379/265.06
See application file for complete search history.

(56) References Cited

U.S. PATENT DOCUMENTS

| | | | | |
|---|---|---|---|---|
| 7,469,047 B2* | 12/2008 | Judkins | ................ | H04M 3/523 |
| | | | | 379/265.01 |
| 8,681,955 B1* | 3/2014 | Koster | ................ | H04M 3/5158 |
| | | | | 379/112.01 |
| 2004/0109557 A1* | 6/2004 | Lenard | .............. | H04M 3/42374 |
| | | | | 379/266.07 |
| 2014/0247933 A1* | 9/2014 | Soundar | .............. | H04M 3/5183 |
| | | | | 379/211.02 |

(Continued)

*Primary Examiner* — Ahmad F. Matar
*Assistant Examiner* — Jirapon Intavong
(74) *Attorney, Agent, or Firm* — Snell & Wilmer L.L.P.

(57) ABSTRACT

A mobile application for a wireless handheld computing device, such as a smartphone, is disclosed in combination with a communication link establishment and management system. Systems and methods are disclosed for calling desired contacts using a smartphone that can take advantage of the power and efficiency of agent-assisted dialing provided by the communication link establishment and management system. The systems and methods automatically integrate with a customer relationship management (CRM) system connected to the communication link establishment and management system.

13 Claims, 27 Drawing Sheets

(56) References Cited

U.S. PATENT DOCUMENTS

2015/0381809 A1* 12/2015 Fleming .............. H04M 3/5232
379/265.11

* cited by examiner

EXECUTE CALLING PLAN FOR TARGET 208

| CALL STATE | NEXT STEP | DONE BY AGENT OR SYSTEM? |
|---|---|---|
| ANSWERED BY A VOICE | CATEGORIZE AS A LIVE PERSON, COMPANY DIRECTORY OR VOICE MESSAGE GREETING | AGENT OR SYSTEM |
| CONNECTED TO A LIVE PERSON | CATEGORIZE THE PERSON AS A GATEKEEPER, THE TARGET, OR SOMEONE ELSE | AGENT |
| CONNECTED TO A GATEKEEPER | EXECUTE GATEKEEPER SCRIPT | AGENT |
| CONNECTED TO THE TARGET | TRANSFER CALL TO THE USER AND RECORD DISPOSITION AS "SUCCESS - TRANSFERRED TO USER" | AGENT |
| CONNECTED TO SOMEONE ELSE | RECORD DISPOSITION AS "FAILED - WRONG NUMBER" | AGENT |
| CONNECTED TO A COMPANY DIRECTORY | DETERMINE IF THE TARGET IS IN THE DIRECTORY | AGENT OR SYSTEM |
| COMPANY DIRECTORY CONTAINS TARGET | TRANSFER TO TARGET'S EXTENSION | AGENT OR SYSTEM |
| COMPANY DIRECTORY DOES NOT CONTAIN TARGET | RECORD DISPOSITION AS "FAILED - NOT IN COMPANY DIRECTORY" AND CALL AS FAILED | AGENT OR SYSTEM |
| CONNECTED TO VOICE MAIL | CHECK FOR PRE-RECORDED VOICE MESSAGE. IF FOUND, WAIT FOR THE TONE AND RECORD THE MESSAGE. RECORD DISPOSITION AS "SUCCESS - VOICE MAIL DROPPED" | AGENT OR SYSTEM |
| BUSY SIGNAL | RECORD DISPOSITION AS "FAILED - BUSY" | SYSTEM |
| FAX TONE | RECORD DISPOSITION AS "FAILED - FAX" | SYSTEM |
| NO ANSWER | RECORD DISPOSITION AS "FAILED - NO ANSWER" | SYSTEM |
| MALFORMED NUMBER | RECORD DISPOSITION AS "FAILED - DATA ERROR" | SYSTEM |
| ANY "FAILED" DISPOSITION | CHECK FOR ANOTHER NUMBER FOR THE TARGET | SYSTEM |
| FOUND ANOTHER NUMBER FOR THE TARGET | DIAL THE NUMBER | SYSTEM |
| DID NOT FIND ANOTHER NUMBER FOR THE TARGET | RELEASE THE AGENT AND TERMINATE THE CALLING PLAN WITH A FAILED STATUS | SYSTEM |
| ANY "SUCCESS" DISPOSITION | RELEASE THE AGENT AND TERMINATE THE CALLING PLAN WITH A SUCCESS STATUS | SYSTEM |

CALLING CONTACTS USING A WIRELESS HANDHELD COMPUTING DEVICE IN COMBINATION WITH A COMMUNICATION LINK ESTABLISHMENT AND MANAGEMENT SYSTEM

CROSS-REFERENCE TO RELATED APPLICATIONS

This application is a continuation-in-part of, claims priority to and the benefit of, U.S. Ser. No. 14/857,546, filed Sep. 17, 2015 and entitled "COACHING IN AN AUTOMATED COMMUNICATION LINK ESTABLISHMENT AND MANAGEMENT SYSTEM" (the "'546 Application"), which claims priority to and the benefit of U.S. Provisional Patent Application Ser. No. 62/051,947, filed Sep. 17, 2014, both of which are hereby incorporated by reference in their entirety for all purposes. The '546 application claims priority to, and is a continuation-in-part of U.S. Ser. No. 14/161,339, filed Jan. 22, 2014, entitled "CONTEXTUAL LEAD GENERATION IN AN AUTOMATED COMMUNICATION LINK ESTABLISHMENT AND MANAGEMENT SYSTEM," now U.S. Pat. No. 8,948,372, issued Feb. 3, 2015 (the "'372 Patent"), which claims priority to and the benefit of U.S. Provisional Patent Application Ser. No. 61/756,295, filed Jan. 24, 2013, both of which are hereby incorporated by reference in their entireties for all purposes. The '372 Patent is a continuation-in-part of U.S. Ser. No. 13/894,126, filed May 14, 2013, entitled "SYSTEM AND METHOD FOR AUTOMATIC UPDATE OF CALLS WITH PORTABLE DEVICE," now U.S. Pat. No. 9,876,886, issued Jan. 23, 2018 (the "'886 Patent"), which claims priority to and the benefit of U.S. Provisional Patent Application Ser. No. 61/646,486, filed May 14, 2012, both of which are hereby incorporated by reference in their entireties for all purposes. The '886 Patent is a continuation-in-part of U.S. Ser. No. 13/412,715, filed Mar. 6, 2012, entitled "CLOSED LOOP CALLING PROCESS IN AN AUTOMATED COMMUNICATION LINK ESTABLISHMENT MANAGEMENT SYSTEM," now U.S. Pat. No. 9,986,076, issued May 29, 2018, which is hereby incorporated by reference in its entirety for all purposes.

BACKGROUND OF THE INVENTION

The present disclosure relates to a method and system for calling desired contacts using a wireless handheld computing device or standalone portable device, such as a smartphone, in combination with a communication link establishment and management system, which is preferably linked to a customer relationship management system. For the sake of clarity and ease of understanding, references will be made to examples of applications for making sales calls. However, one of ordinary skill in the art will understand that the concepts described herein are applicable to any number of different fields, including, but not limited to, any contact relationship management system, telephone surveys, telephone number verification, census information gathering activities, fund raising campaigns, political campaigns, or any combination thereof.

An automated system for telephonically calling desired prospects with a standalone portable device will involve calling attempts on separate successive sessions, which may be separated by a number of days, weeks, or in some cases, even months. An example of an automated system for facilitating telephone call connections between a user and a prospect is described in U.S. Patent Application Publication No. US 2007/0121902 A1, published May 31, 2007, entitled TRANSFER OF LIVE CALLS, based upon application Ser. No. 11/556,301, filed Nov. 3, 2006, the entire disclosure of which is incorporated herein by reference.

Users such as sales people who make calls to prospects are heavy users of mobile telephones, especially smartphones that combine features of a cell phone with those of a computer. While smartphones provide many applications to help the sales person work more effectively, it is still challenging to use smartphones effectively to reach the right prospects with whom the sales person needs to contact. In addition, it is difficult for the sales person to make required and useful updates to the correct records in the contact database that is used by their company. It is time consuming to keep contact lists updated for both initial and follow up conversations, as smartphone user interfaces are not optimized for adding, updating and deleting the hundreds of frequently changing contacts typically needed to support outbound sales calls. Because of their small size, smart phones have limited area to devote to dialing keypads and keyboards, making manual dialing slower and more error prone than on a desk phone or desktop computer system.

Accordingly, what is needed is an improved system and methods for facilitating the calling of desired contacts using portable devices or wireless handheld computing devices, such as smartphones. An automated system for updating the contacts database with the outcome of each conversation is also desired.

Customer relationship management ("CRM") systems are typically used as master repositories for customer and prospect information. When using an automated calling process, the user has conversations with prospects that need to be correctly recorded in a CRM system, such as logging the call, setting a status field on the lead or contact record to indicate that at least one conversation has taken place, and creating a task record for follow up action. These updates need to be performed in a way that allows the user to mix automated calling sessions with unscheduled manual dialing and scheduled meetings in a coordinated way that avoids conflicts, such as calling a prospect back too early, or before an agreed-upon next step has been taken. While these updates can be performed manually by the user within the CRM system, when using a portable device or wireless handheld computing device, such as a smartphone, it is more efficient and accurate to have the updates performed automatically.

BRIEF DESCRIPTION OF THE DRAWINGS

The features, obstacles, and advantages of the present invention will become more apparent from the detailed description set forth below when taken in conjunction with the drawings, wherein:

FIG. 10 illustrates a state table that is associated with the method depicted in FIG. 9.

FIG. 11 illustrates a screenshot of a display provided as an agent interface for use in connection with an automated calling system.

DETAILED DESCRIPTION OF ONE OR MORE EMBODIMENTS OF THE INVENTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
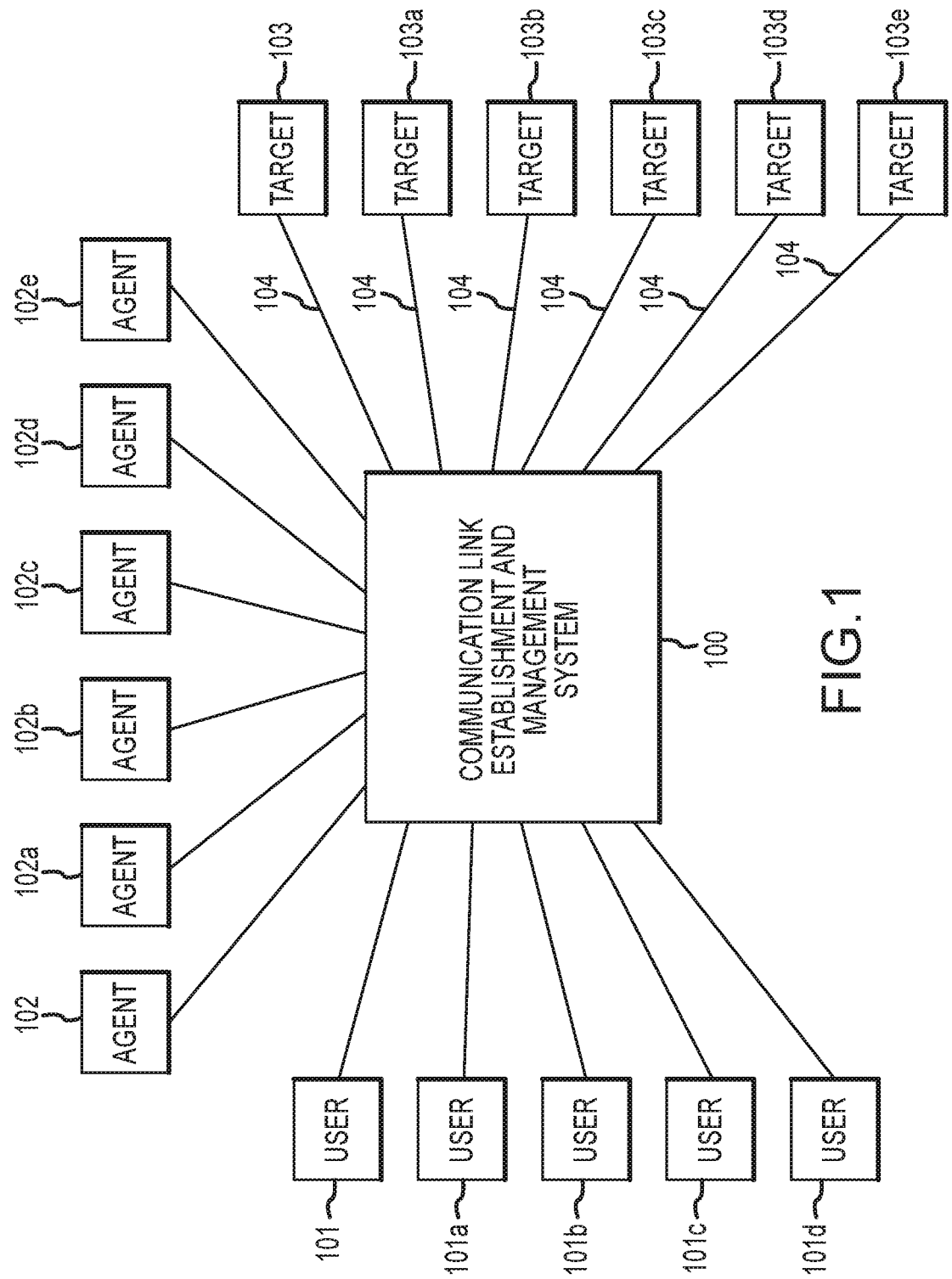
FIG. 1 is a block diagram depicting a system according to one embodiment described herein.

Referring to FIG. 1, a communication link establishment and management system 100 is provided. A plurality of users 101, 101a, 101b, 101c and 101d are shown in FIG. 1. In the illustrated example, the users 101 may be sales personnel who need to contact potential customers via telephone to sell a product or service. The communication link establishment and management system 100 is operative to establish communication with targets 103, 103a, 013b, 103c, 103d, 103e.

Although the communication link establishment and management system 100 provides the capability of simultaneously executing the same calling list for multiple users 101, 101a, 101b, 101c and 101d (under circumstances where any one of the users 101, 101a, 101b, 101c and 101d are equally capable of having a conversation with any target 103, 103a, 013b, 103c, 103d, 103e on the calling list) in most typical applications a given calling list will be executed on behalf of only one user 101a at a time.

In typical applications, a user 101a may provide a calling list to the communication link establishment and management system 100, or have a calling list automatically generated, for example, based upon queries to a database 111 or based upon queries to a separate customer relationship management system, contact management system, or task management system. Then that user 101a can sit back and wait for a few moments as the communication link establishment and management system 100 starts dialing, and in a few moments, start talking directly to desired target persons 103 as soon as the first successful communication link is established.

In the illustrated example, communication with the targets 103 is established telephonically using the public switched telephone network 104. The public switched telephone network (PSTN) refers to the worldwide network of public circuit-switched telephone networks, including telephone subscriber lines, telephone trunk lines, cellular networks, transoceanic telephone cables, fiber optic cables, microwave links, and satellite links, which are all inter-connected by switching centers. The PSTN allows any telephone in the world to be connected with any other for voice communication. The PSTN initially was a network of analog telephone systems connected to twisted pair cables. Over the years, the PSTN was upgraded to almost entirely digital switching networks, and now includes mobile telephones as well as fixed telephones.

As shown in FIG. 1, agents 102, 102a, 102b, 102c, 102d, 102e function to facilitate the establishment of a communication link between a user 101 and a target 103. In the illustrated example, an agent performs important functions in completing calls between a sales person 101 and a potential customer 103. Typically, users 101 participate in the calling activity of the system 100 during a period of time referred to as a calling session. The user 101 may have a sales pitch to deliver, and would like to deliver the pitch to sequential targets or potential customers 103 without substantial interruption or downtime between successful connections to a potential customer 103. The user or pitcher 101 is associated with a calling list that includes telephone numbers and target identifying information. The calling list may be extracted from a conventional contact management system, or a customer relationship management system. An example of a commercially available customer relationship management system is salesforce.com.

The present invention provides significant advantages that may not be readily apparent to persons skilled in the art who have not witnessed the operation of the communication link establishment and management system 100 in practice. In one survey of over a hundred North American technology companies in the year 2010, the average inside sales person was only able to make 47 telephone call attempts a day. In attempting to complete calls to targets 103 to successfully engage in conversations with them, a business person must typically dial from a list of telephone numbers, navigate IVR systems and automated attendant systems, go through operators, talk to gatekeepers, go through company directories, listen to voicemail greetings, redial alternate numbers for a target 103 when the original number is busy, turns out to be a facsimile number, or there is no answer, and so forth. In order to achieve a rate as high as 47 call attempts a day, the average person must concentrate solely upon the calling activity to the exclusion of everything else.

In practice, the success rate is about twenty-two call attempts for every conversation successfully conducted with a desired target person 103. At a success rate of 22 to 1, a sales person who makes 47 calls a day will only average two to three conversations a day with desired targets 103. When the targets 103 are higher-level executives, the success rate drops even lower. For mid-level executives, experience has shown that the success rate is typically only about one out of every thirty-five call attempts. When the targets 103 are upper level management, the success rate drops even lower.

While the present description of an embodiment of the invention uses the example of a business that sells to potential customers over the telephone, the usefulness of the present invention is not limited to a telephone sales environment. In most businesses, having conversations with potential customers, potential investors, potential partners, existing customers, etc., is vital to the success of the business. Yet, as the value of the target person 103 goes up, the difficultly in establishing communication with the target 103 typically goes up as well, and consequently, the success rate of calling attempts goes down.

The value of the target 103 is not the only relevant factor. The value of the user 101 to the business is also an important consideration. As the value and importance of the user 101, who is attempting to establish communication with a target 103, goes up, such higher value users 101 typically have greater responsibilities in connection with their respective business, and usually have important meetings and other business activities that place demands upon the user's time. Therefore, an inverse relationship typically exists between the value and importance of the user 101 attempting to establish communication with a target 103, and the time that the user 101 has available to engage in dialing and attempting to call the target 103. Nevertheless, having communications with targets 103 is a business critical activity that must be done for the success of a user's business.

Experience has also shown that calls are more efficiently done if the calls are made in a block in which conversations concerning a similar theme or subject matter are concentrated together. This may be defined as monothematic calling sessions. For example, it is more efficient for a user 101 to arrange in a block, or a single calling session, all calls that the user 101 needs to make to venture capitalists with whom the user 101 wants to talk to about investing in the user's business. Or the user 101 may wish to devote a calling session to conversations with existing customers, either to gauge customer satisfaction, explore an expansion of the existing business, discuss a new product offering or product upgrade, etc. Or the user 101 may engage in a calling session for the purpose of engaging in conversations with a list of targets 103 that the user 101 wants to talk to about an expansion of the user's business into Europe or some other new territory.

Experience has shown that a user 101 generally has better results when engaging in conversations concerning the same subject matter or theme, if the conversations are grouped together and conducted in a concentrated activity. If a user 101 is able to engage in several conversations in a relatively rapid sequence, it is easier to take advantage of anything that is learned during a previous conversation and apply it to subsequent conversations. For example, it is easier for the user 101 to try different approaches and to accurately gauge which approach appears to achieve better results. When conversations occur in a concentrated fashion, it is easier for a user 101 to try different messages, to try different calling lists, or to try different times of day for attempting calls. For example, if a user 101 is attempting to manually place calls at the slow success rate typical of conventional dialing approaches, it is difficult for the user 101 to reliably determine such information as, for example, when is the best time of day to call potential customers on the East Coast, or what day of the week do targets 103 on a particular list having certain characteristics tend to answer the telephone more frequently, etc.

A communication link establishment and management system 100 in accordance with the present invention typically provides a user 101 with an average of ten conversations an hour with desired target persons 103. A system 100 in accordance with the present invention effectively divides the activity of attempting calls into three parts. The part that can be done automatically by a machine is performed by the system 100. The part that can be performed by a person with general skills relating to call placement, and which does not require expertise in the user's business and specialized knowledge relevant to the subject matter of the desired conversation, can be performed by agents 102. The part that requires the skill and expertise of a high value user 101, i.e., the actual conversation with a target person 103, is isolated so that, as far as the system 100 is concerned, the user 101 only spends time engaging in the actual desired conversations with the targets 103. While the system 100 and the agents 102 are working to successfully establish communication with a desired target person 103, the user 101 is free to engage in other work activities, such a reading emails, drafting correspondence, completing reports, etc. The user 101, who may be a high skilled person whose involvement in meetings and business decisions is crucial to the success of the users' business, is allowed to maximize the time available for such business critical activities, while at the same time efficiently using the user's time that is required to engage in important conversations with targets 103 which are vital to the success and growth of the user's business.

A communication link establishment and management system 100 in accordance with the present invention further provides the significant functional advantage of providing the ultimate diagnostic tool for a business. The ability to engage in concatenated conversations with existing customers, potential customers, existing investors, potential investors, existing partners, potential partners, etc., and then observe the results of those conversations and utilize the data and information gathered during such conversations, is an enormous advantage to any business. Such critical information is invaluable in analyzing and improving a business, and is important in the improvement of marketing campaigns, the improvement of sales approaches, the improvement of customer satisfaction and customer relations, the improvement of business strategies and business models, and the improvement of many other procedures, goals and activities. These and other advantages may not be relatively apparent unless and until a person skilled in the art actually observes and experiences the effectiveness and the operation of the present invention in practice.

Figure 2:
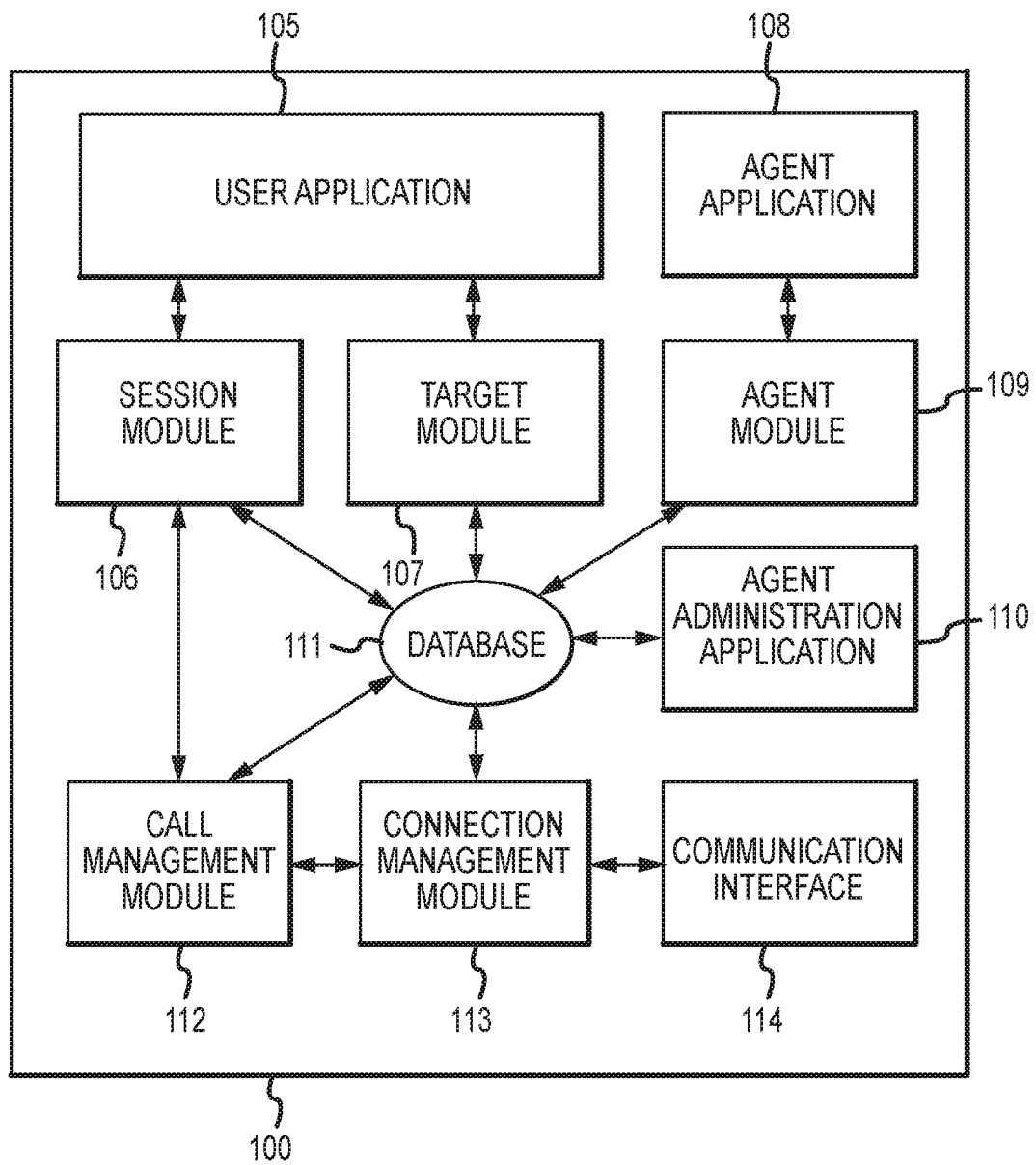
FIG. 2 is a block diagram illustrating further details of the communication link establishment and management system shown in FIG. 1.

FIG. 2 is a block diagram illustrating further details of the communication link establishment and management system 100 shown in FIG. 1. The communication link establishment and management system 100 may be implemented with a server. In the illustrated example, the communication link establishment and management system 100 comprises a user application 105, a session module 106, and a target module 107, all of which may be running on a server. The communication link establishment and management system 100 further comprises an agent application 108, an agent module 109, and an agent administrative application 110. A call management module 112, a connection management module 113, and a communication interface 114 are also provided. In one embodiment, the communication interface 114 may be a telephone interface, for example, where the communication link establishment and management system 100 is connected to the PSTN. In another embodiment, the communication interface 114 may be a network interface, for example, where the communication link establishment and management system 100 is connected to the Internet. A database 111 is stored on a data store, such as a hard disk drive, a RAM drive, or any other suitable storage device.

The user application 105 keeps track of the state of calls and other actions associated with the user 101, and generates any display or other output or interface provided to a user 101 during a calling session. In one embodiment, the user application 105 may reside on the server for the communication link establishment and management system 100, as shown in FIG. 2. A user 101 may interact with the communication link establishment and management system 100 using a web browser running on a personal computer. Alternatively, a portion of the user application 105 may be installed or downloaded onto a user device, such as the user's personal computer, or the user's wireless handheld computing device, such as a smartphone or tablet, although in that case some small portion of the user application 105 may still reside on the communication link establishment and management system 100.

The session module 106 keeps track of the state of a currently running calling session. The session module will keep track of the state of a calling session, including whether the user 101 is busy at any given moment in time, whether the system 100 is dialing, whether the system 100 is pausing, whether the user 101 is talking, etc. The target module 107 keeps track of the state of events and conditions relating to targets 103, such as which targets 103 are being called, when the last call attempt was made to a target 103, historical calling attempts associated with a target 103, information relating to the quality of contact information associated with a target 103, such as bad numbers, updated information, etc. In one embodiment, call disposition data and information associated with targets 103 and a current calling list, are maintained in memory and at the end of a calling session, are stored in a database 111, which information may later be transferred to an external contact database or customer relationship management database.

Figure 11:
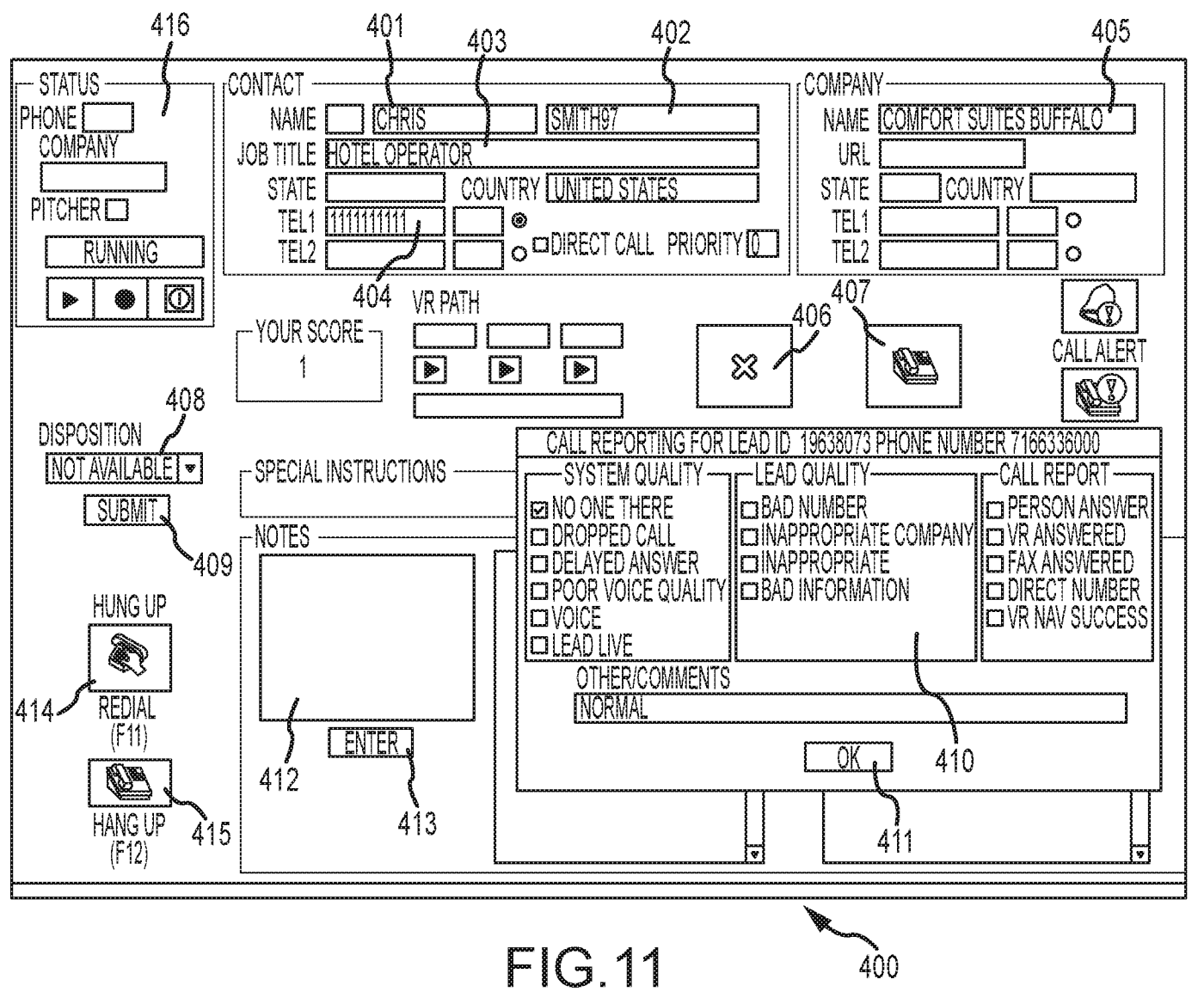

The agent application 108 provides an interface with agents 102, and generates displays for agents 102 such as the screenshot shown in FIG. 11. The agent module 109 handles actions among the group of available agents 102a, 102b, 102c, 102d and 102e. The agent module 109 maintains agent characteristic information, such as agent skills (languages spoken, etc.), agent experience, agent cost, and other characteristic information. The agent module 109 shown in FIG. 2 performs the function of determining which agent 102a, 102b, 102c, 102d, or 102e should be selected to handle a calling attempt (based upon agent characteristic information and agent selection criteria) when a call attempt needs to be transferred to an agent 102 in step 207 shown in FIG. 9.

Referring to FIG. 2, the agent administration module 110 is used to create and update agent associated records and to identify each agent 102a, 102b, 102c, 102d, and 102e. For example, the agent administration module 110 maintains a table or index for data concerning each agent's cost (labor cost or pay rate), the identity of the vendor that supplied the agent 102, the employer of the agent 102 if the agent labor is outsourced, an agent ID or identifying indicia unique to each agent 102, the experience level of an agent, the number of calls handled by an agent, the average time interval between calls for each agent, and other performance metrics and agent characteristic information. The agent administration module 110 records data to track and score each agent's performance and other metrics that are useful in evaluating an agent 102.

The call management module 112 keeps track of call states, for example whether a telephone number is ringing, whether a user 101 is busy or is available for a call transfer, what calls are being attempted for a particular user 101, etc. The connection management module 113 controls and keeps track of each connection. For example, the connection module 113 keeps track of whether a user 101 actively involved in a calling session called into the system 100, or whether the system 100 called the user 101, and if so, at what number. The connection management module 113 is operative to cause a user 101 to be connected to a target 103 at appropriate times, for example, when an agent 102 clicks on the transfer button 406 shown in FIG. 11, which is described more fully below. The connection management module 113 is operative to cause an agent 102 to be connected to a calling attempt so that the agent 102 can hear the call in progress, and can communicate with a gatekeeper or navigate an automated attendant system.

In the illustrated embodiment shown in FIG. 2, the various modules may intercommunicate with each other via the database 111. In an alternative embodiment, a data bus or communication bus may be provided, and each of the modules 106, 107, 109, 112, and 113 may be connected to the bus in order to communicate with each other. In such an alternative embodiment, the database 111 would also be connected to the bus. In addition, the agent administration application would also communicate via the bus with the database 111 and the agent module 110.

The structure of the components of the communication link establishment and management system 100 having been described, attention will now be turned to the functionality of the various components. It is understood that the illustrated system 100 is merely one embodiment of how the features of the present invention may be implemented. However, a number of alternative configurations are possible. For example, the features of a server and the database 111 may be performed, in whole or in part, at a user device; (e.g., a personal computing device may be configured to achieve some or all of the functionality of a server and the database storage 111 described herein). Alternatively, the database storage 111 may be integrated on a separate server at a single location while communicating with the user 101 over a network 104, (e.g., the Internet). Those of ordinary skill in the art will recognize that a plurality of different implementations of the present invention are possible and are all within the spirit and scope of this disclosure. However, for the sake of clarity, the following description will refer to the illustrated system shown in FIG. 1.

One embodiment of the present invention provides a calling process that creates and manages metadata about prospects. The stored metadata may be used advantageously to create calling lists of targets having certain characteristics.

The stored metadata includes status information concerning the target 103. Status information includes whether the user 101 has talked to the associated target 103. Status information includes whether this target is someone that the user wants to talk to, whether this target is someone the user does not want to talk to, etc.

The stored metadata includes information concerning an attention class associated with the target 103. One possible attention class is that the next unscheduled conversation is "urgent," meaning that contact should be made as soon as possible with the target 103. Another possible attention class is that the next unscheduled conversation with the target 103 is "priority," meaning that it should be preferentially attempted ahead of non-priority contact attempts in future calling sessions. A third possible attention class for a target 103 is "normal."

The stored metadata includes information concerning the next steps to take with respect to the target 103. The purpose of the "next steps" data is to record in the database 111 information that may be readily provided to a user 101 and displayed on the user's screen provided by the user's portable device when the user 101 has a later conversation with the associated target 103. This may include notes that describe the anticipated next actions to be taken in the ongoing interaction with the target 103. The next steps information can include, for example, schedule a meeting, check on the status of an order, generate a quote or proposal, etc. The next steps may create a dependency wherein some act must occur or some condition must be met before the target may be included in a calling list.

The stored metadata includes information relating to the earliest date on which any further calling attempts can be made with respect to the target 103. The effect of this data is to exclude the target 103 from any calling lists generated for calling sessions prior to this date, which is sometimes referred to as a "wait until" date, or alternatively as a "hold until" date. After the follow up date stored in this metadata, the target 103 associated with this record is eligible to be included in calling lists. Note that the next steps metadata may have an impact on the date stored here. Because the next steps metadata may create a dependency wherein the target should not be included in a calling list until some act is performed, such as putting together an estimate or proposal requested by the target, the context of the next steps data may determine the date of any "wait until" date stored for the target 103.

The stored metadata includes a "hold flag" which is used to insure that the associated target is excluded from any automatically generated calling lists while the flag is set. There are many circumstances under which a user 101 would not wish to have an automated calling system 100 include a particular target 103 on a calling list of people who are being automatically called by the system 100. The "hold flag" is used for the purpose of excluding the associated target 103 from calling lists.

The metadata can also include a flag indicating whether the next attempt to contact the target 103 will be in an automated calling session or some other way, including a scheduled call or meeting.

The metadata associated with a target 103 preferably is contextually associated with a particular user 101a. The metadata status field for target 103a that is associated with user 101a may be set to indicate that the target 103a has been talked to by user 101a, but the metadata status field for target 103a that is associated with user 101b may be set to indicate that the target 103a has not been talked to by user 101b. Similarly, the metadata field for next steps associated with target 103a may be set to one value for user 101a, and set to a different value for user 101b, in circumstances where some action needs to be taken specifically by user 101a but is not applicable to user 101b.

However, in most businesses, a target 103a will be allocated to a specific user 101a based on territory or some other exclusivity parameter, and it will be unusual for two different users 101a and 101b to be calling the same target 103a. Nevertheless, the automated calling system 100 according to the present invention allows for the coordination of calling lists generated for overlapping targets 103 who may potentially appear on calling lists for more than one user 101 in a business.

In one embodiment, the metadata described herein may be maintained in a standalone data management application such as Microsoft Excel, with the user opening a contact spreadsheet after each conversation, finding the row that matches the conversation, and setting values in columns corresponding to the metadata described above. However, in another embodiment, the metadata is maintained in the automated calling system's database 111, and managed through a user interface provided by the automated calling system 100 after each conversation. In an alternative embodiment, the metadata could be maintained in a customer relationship management ("CRM") system or the like, and managed through the CRM system's user interface. Alternatively, the metadata is maintained in a CRM system, and the automated calling system 100 provides a user interface in conjunction with an integration capability that updates records in the CRM system. In various alternative embodiments, the user interfaces may be implemented with voice commands to select the calling list, initiate the calling session, record the outcome of each conversation as a disposition with optional "next step" notes and follow-up date, and resume the calling session.

The metadata described herein is useful in generating calling lists and reports. In particular, the metadata may be used to generate optimized or thematic calling lists where targets 103 to be called are all associated with a particular theme or purpose or project. Predetermined query filters or report definitions can be created in the automated calling system 100, or provided in any of the embodiments involving a separate CRM system, wherein the query filters use the metadata values to generate optimized calling lists for different purposes. For example, predetermined calling list generation filters may be provided to efficiently support having an automated calling session that is dedicated to a theme, such as "Business Development Calls to New Leads", "Follow Up Conversations for Sales Campaign", "Urgent Conversations", "High Priority Follow-Up Calls", "End of Month Contract Closing Calls", and so on. As the metadata is updated after each conversation, these predetermined query filters and reports have the effect of moving any individual target or prospect 103 automatically between different lists as conversations occur or other information becomes available that results in the metadata being changed outside of the automated calling process itself.

A calling process in accordance with the present invention handles the problem of using contact lists to reach prospects on a user's portable device, such as a smartphone. For example, using the system in conjunction with the user's smartphone, the user could speak or type a command such as "Call Urgent Follow-up List", and then simply wait for connections to prospects to be delivered. The prospect's contact information would be displayed on the smart phone display, and optionally delivered audibly by synthesized voice or by a voice recording made by an agent working as part of the calling system.

In an embodiment involving a separate CRM system, the automated calling system 100 may include a programmable CRM integration system that queries the separate CRM system to assemble and upload calling lists containing an appropriate combination of new leads, urgent activities, current activities, high priority activities and past-due activities. In addition, the programmable CRM integration system updates potential multiple records in the CRM system after each conversation with a target 103 in order to implement part of the functionality of the calling process described herein. A calling system in accordance with the present invention allows the user 101, or an administrator of the automated calling system 100, to define query filters or pre-defined CRM reports to be used to select the contact information for appropriate contacts for calling sessions. The user 101 can choose one or more of these predetermined filters or reports for a given session, either by typing or issuing verbal commands through their portable device, and the programmable CRM integration system automatically invokes the predetermined query or report on the CRM system to load the resulting contact information into a calling list in the calling system 100.

The user 101 optionally modifies the calling list through a user interface that allows specific contacts, or all contacts that match a criterion such as "company", to be eliminated from the calling list. The user 101 can also designate one or more targets 103 on the calling list as "high priority", directing the automated calling system 100 to more intensively attempt to contact those targets 103 during the calling session.

After each conversation with a target 103, the user 101 uses the calling system user interface to record the disposition of the call, using pre-defined, optionally customized disposition field values, along with the follow-up date, "next steps" notes, and any other information that might be optionally required by the CRM system. In accordance with one embodiment of the present invention, the user would be prompted to select one of a set of pre-defined call dispositions after each conversation is completed, and to optionally enter "Next Step" notes and a follow-up date. The user could choose to change the status of the appropriate records in the CRM database, or in the calling system's database, to indicate that the next conversation with the prospect is urgent, or high priority, or that the prospect should be put on hold and not included in further automated calling sessions until the hold is taken off. These inputs could be provided by the user through a touch screen on the smartphone (or other wireless handheld computing device or portable device), or by use of a touchpad or keyboard either integrated with or connected to the smartphone/portable device, or by using voice commands.

The automated calling system 100 invokes the programmable CRM integration system with a command to update the CRM system with this information. The programmable CRM integration system has a programmable capability that, for each CRM system for each business using the automated calling system 100, allows an integration administrator to designate a sequence of actions to be taken in the CRM system. This sequence of actions is different for each kind of CRM system, such as Salesforce.com or Microsoft Dynamics. It can also be different depending on the call disposition selected by the user 101, and may also vary depending on values of records within the CRM system, and on how the CRM system has been configured and is being used. The actions may consist of updating some records, such as setting the status on a target record to "Had Conversation", optionally in combination with creating additional records, such as a task record indicating when the next attempt can be made to have a follow-up conversation with the target 103.

Additionally, each automated calling session produces information about calls that were attempted but not successfully connected. At the end of the session, or optionally after each attempt, or at some other time, the automated calling system 100 can invoke the programmable CRM integration system with a command to update the CRM system based on the call attempt records. The programmable CRM integration system can then use the call disposition information to automatically inactivate Lead or Contact records with known bad information, or can correct such records with information discovered during the calling session.

The programmable CRM integration system can produce a record of its inputs and the commands or other actions it invoked on the CRM system in order to support identification of possibly incomplete transactions where one or more, but possibly not all, of the defined set of steps were taken, perhaps because the CRM system became unavailable or inaccessible during the update, or because an update step failed and returned with an error, or never completed. One advantage of the present invention is that monothematic calling lists may be created by combining query filters using the metadata described herein, in combination with additional query filters on other fields in the database 111 or the CRM system. Such monothematic calling lists may also be referred to as optimized calling lists. Examples of other theme fields in the database 111 or CRM system that may be used include the business purpose fulfilled by the contact for the user and target, the user's time zone in conjunction with the time scheduled for the calling session, the geographical location of the target in conjunction with the geographical location of the user 101, etc. For example, a user 101, who is traveling in San Francisco and has spare time to make calls, may ask the automated calling system 100 to call all of the user's "priority" targets 103 who are geographically located within fifteen miles of the user's current geographical location.

Figure 3:
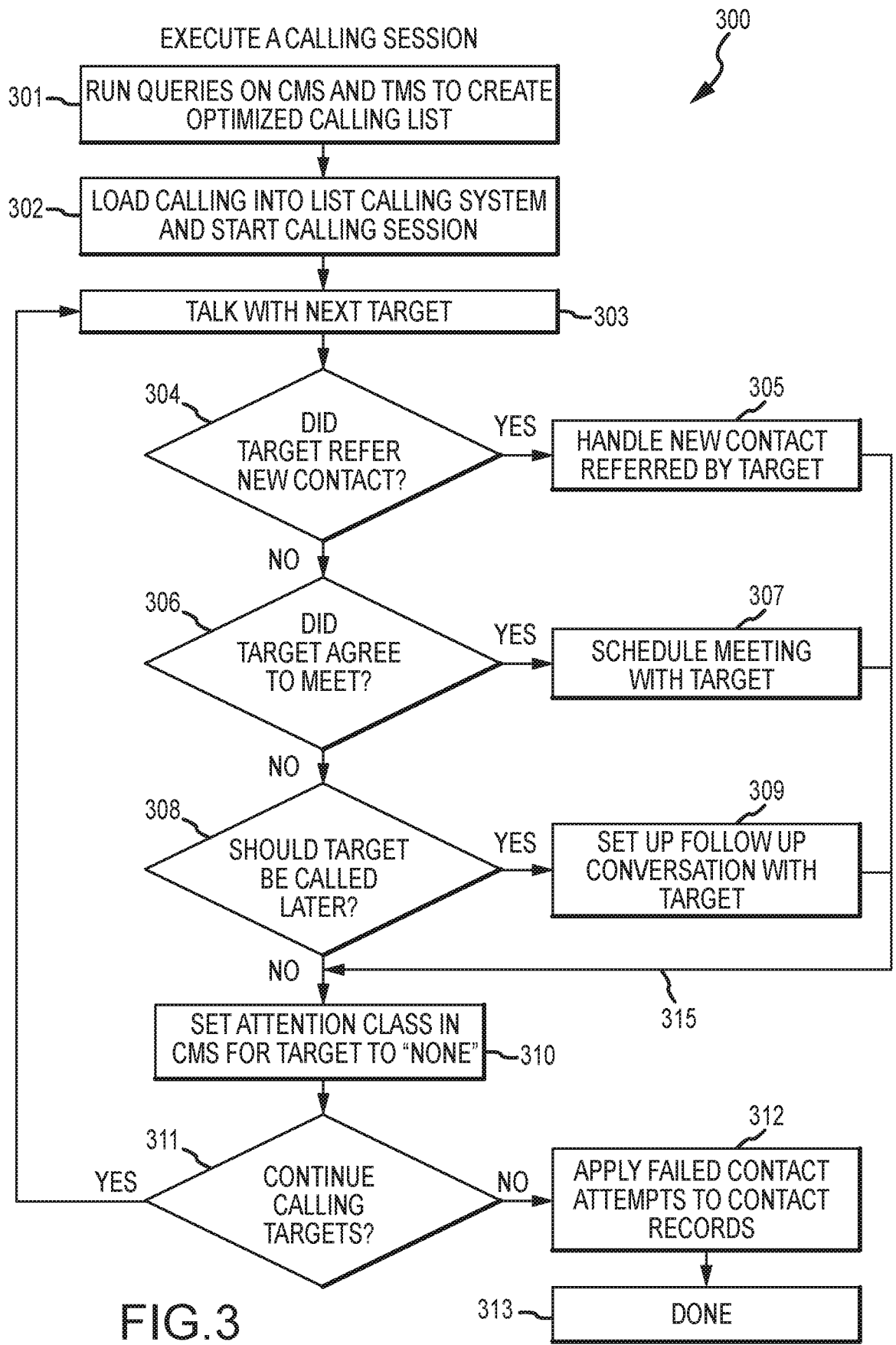
FIG. 3 illustrates a flow chart of a method of executing a calling session.

Turning to FIG. 3, a flow chart for a calling process in accordance with the present invention is shown. One embodiment of steps associated with a method of executing a calling session is shown. In step 301, a calling list is created for use in a calling session. As described above, queries may be run on information contained in the database 111, or on a contact management system ("CMS") or a task management system ("TMS") to create an optimized calling list. A CMS and a TMS are both components that are included in a conventional CRM system.

Once the calling list is invoked, either by typed or verbal commands using the user's portable device, the calling list is loaded into the automated calling system 100 in step 302, and a calling session is started, in this example, for a single user 101a. While this particular calling list may be in use for only this particular user 101a, the communication link establishment and management system 100 has the capability of running a plurality of callings sessions simultaneously for multiple users 101a, 101b, 101c, 101d, etc., each of whom has a unique calling list that is being executed for each respective calling session. Therefore, a plurality of agents 102a, 102b, 102c, 102d, 102e are available to assist in any of the simultaneously running calling sessions as needed.

In step 303, when the communication link establishment and management system 100 establishes a connection with a target 103a, the associated user 101a (whose calling list included target 103a) is connected to the target 103a and has a conversation with the target 103a.

In a calling process according to the present invention, events that occur during a conversation with a target 103, or as a result of a conversation with a target 103, may be processed automatically by the communication link establishment and management system 100 and associated information may be stored in the database 111. In step 304, if the target 103a referred the user 101a to a new contact or target 103b, the illustrated method proceeds to step 305. The process of handling a new contact or target 103b referred by the current target 103a is executed in step 305, which is further illustrated in more detail in FIG. 4. In step 306, if the target 103a agrees to meet with the user 101a or someone else in the user's company (e.g., user 101b) or someone associated with the user 101a, the process of scheduling a meeting with the target 103a is executed in step 307, which is further illustrated in more detail in FIG. 5. In step 308, if one outcome of the conversation included setting up a follow up conversation with the target 103a, the process of setting up a follow up conversation with the target 103a is executed in step 309, which is further illustrated in more detail in FIG. 6.

At the completion of a conversation, in step 310 the metadata for "attention class" is set to none, and the status of the target 103a is changed to someone that user 101a has talked to. In addition, user 101a will be prompted to select one of a set of pre-defined call dispositions after each conversation is completed. User 101a will also be able to optionally enter "Next Step" notes and a follow-up date. The user could choose to change the status of the appropriate records in the CRM database, or in the calling system's database, to indicate that the next conversation with the prospect is urgent, or high priority, or that the prospect should be put on hold and not included in further automated calling sessions until the hold is taken off. These inputs could be provided by the user through a touch screen on the smartphone (or other wireless handheld computing device or portable device), or by use of a touchpad or keyboard either integrated with or connected to the smartphone/portable device, or by using voice commands.

Thus, the information associated with this target 103a stored in the database 111 will be updated to reflect the updated metadata for this target 103a, changing the "attention class" and/or the "status" metadata stored for target 103a to a changed state. As a result of the changed state of the metadata, subsequently generated calling lists for user 101a will not incorrectly include target 103a with lists of targets who have not yet been talked to. Alternatively, as explained herein, updated metadata may be transferred to a third-party CRM system, third-party contact management system, or task management system.

After the conversation with the first target 103a is completed, in step 311, the system 100 checks the calling list to determine if the list has been completed. If additional targets 103b, 103c, 103d, etc., are on the calling list, and any time constraints placed upon the calling session have not expired, the communication link establishment and management system 100 will loop back from step 311 to step 303 and proceed with the process of establishing a communication connection between the user 101a and a second target 103b in step 303.

During a calling session, while the system 100 is performing the method 300 and looping through steps 303 to 311, the communication link establishment and management system 100 stores information associated with each call disposition. When the calling list has been completed, method 300 proceeds from step 311 to step 312, and information associated with each call disposition may be stored in the database 111, or can be transferred to a third-party CRM system, to a third-party contact management system, and/or to a third-party task management system, as shown in step 312. In the illustrated example, the information associated with call dispositions dealt with in step 312 involves information associated with failed attempts to contact a target 103. The process of applying failed contact attempts to the database 111, or alternatively to a third-party CRM system, to a third-party contact management system, and/or to a third-party task management system, is shown in more detail in FIG. 7. After the process described in step 312 is performed, the method 300 depicted in FIG. 3 ends at step 313.

Figure 4:
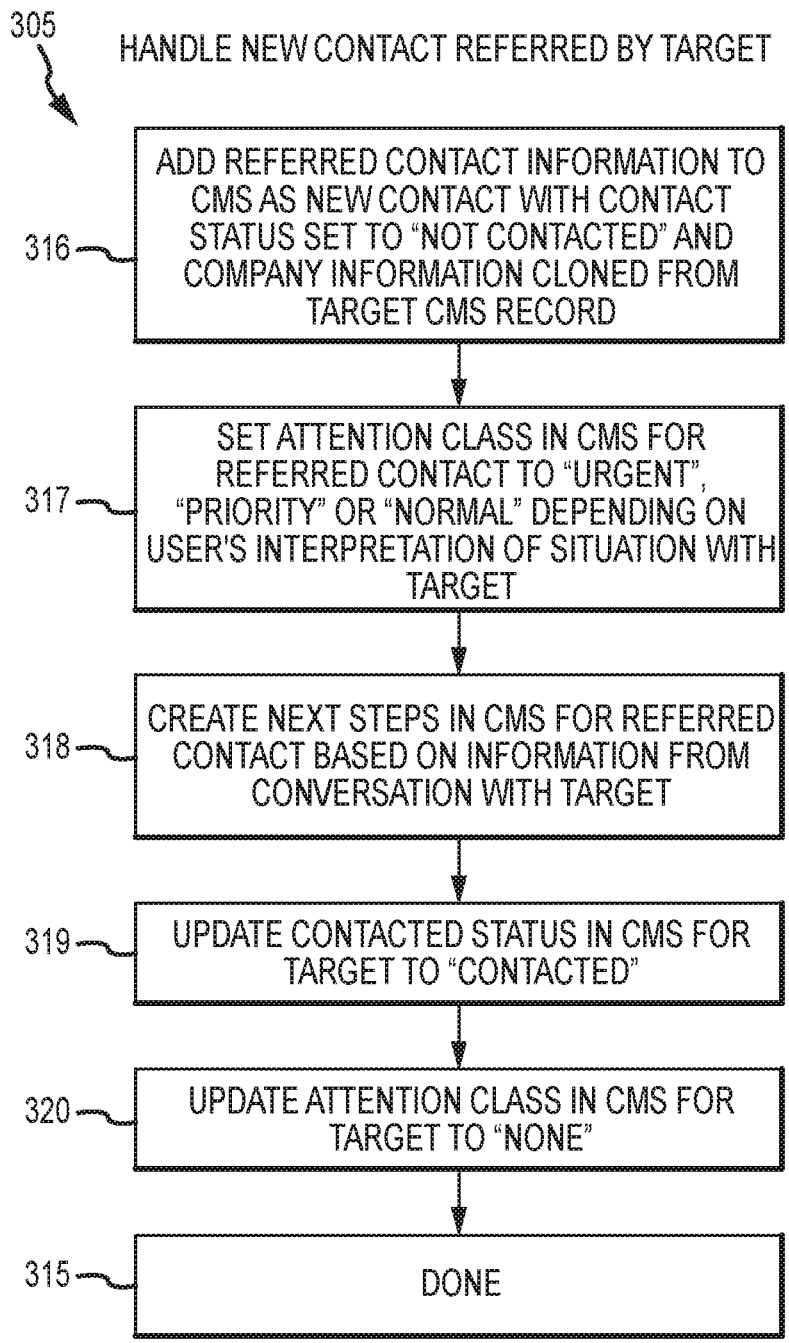
FIG. 4 illustrates a flow chart providing more details for the method of handling a new contact referred by a target shown in FIG. 3.

Turning to FIG. 4, a method 305 is illustrated in more detail for handling a second target 103f referred by a first target 103a. The method 305 begins with step 316, in which the information associated with the second target 103f is added to the database 111. Alternatively, the information associated with the second target 103f is added to a third-party CRM system, to a third-party contact management system, and/or to a third-party task management system. The communication link establishment and management system 100 automatically sets certain metadata fields when step 316 is performed. The system 100 sets the metadata "status" field for new target 103f to "not contacted." If the second target 103f that was referred by the first target 103a is employed by the same company, which in many applications will be true in most instances, the company information associated with the first target 103a will be cloned, or copied into the new record for the second target 103f. In the case in which the system 100 is operating in conjunction with a third-party CRM system, a third-party contact management system, and/or a third-party task management system, the company information that is cloned for the second target 103f will be the company information stored in such third-party systems that is associated with the first target 103*a*.

As shown in FIG. 4, in step 317, the metadata for the "attention class" field for the second target 103*f* will be selectively set by the system 100 based upon input from the user 101*a*. The communication link establishment and management system 100 will set the metadata "attention class" field to "urgent," "priority," or "normal" as appropriate depending on the user 101*a*'s interpretation of the situation based upon the context of the conversation with the first target 103*a*.

In step 318, the metadata for the "next steps" field associated with the second target 103*f* will be selectively set by the system 100 based upon input from the user 101*a*. The communication link establishment and management system 100 will set the metadata "next steps" field as appropriate depending on the conversation between the user 101*a* and the first target 103*a*. The metadata will be stored in the database 111. Alternatively, the corresponding information stored in a third-party CRM system, a third-party contact management system, and/or a third-party task management system, will be updated.

In step 319, the communication link establishment and management system 100 will automatically set the metadata "status" field for the first target 103*a* to "contacted," and the corresponding metadata stored in the database 111 will be updated. Alternatively, the corresponding metadata stored in a third-party CRM system, a third-party contact management system, and/or a third-party task management system will be updated. In addition, in step 320, the communication link establishment and management system 100 will automatically set the metadata "attention class" field for the first target 103*a* to "none," and the corresponding metadata stored in the database 111 will be updated. Alternatively, the corresponding metadata stored in a third-party CRM system, a third-party contact management system, and/or a third-party task management system will be updated. The method 305 is completed in step 315, and proceeds via 315 shown in FIG. 3 to step 310, as previously described.

Figure 5:
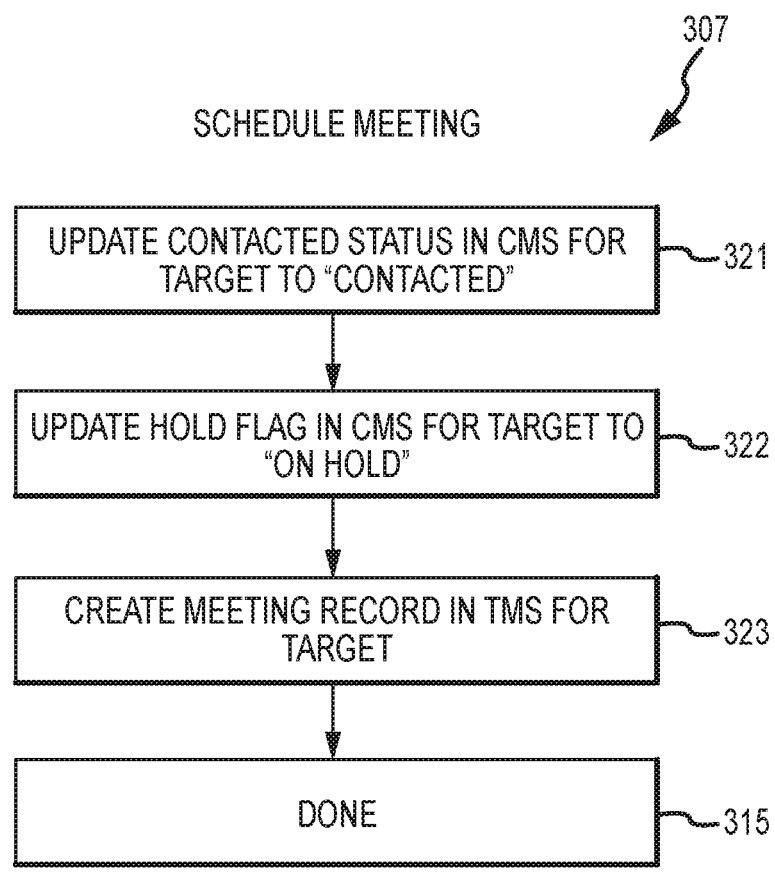
FIG. 5 illustrates a flow chart providing more details for the method of scheduling a meeting with a target shown in FIG. 3.

FIG. 5 shows a method 307 for scheduling a meeting in more detail. In step 321, the communication link establishment and management system 100 will automatically set the metadata "status" field for the first target 103*a* to "contacted," and the corresponding metadata stored in the database 111 will be updated. Alternatively, the corresponding metadata stored in a third-party CRM system and/or a third-party contact management system ("CMS") will be updated.

Referring to FIG. 5, in step 322, the communication link establishment and management system 100 will automatically set the metadata "hold flag" to "true," and record the new setting for the "hold flag" in the database 111. Alternatively, the corresponding metadata stored in a third-party CRM system and/or a third-party contact management system ("CMS") will be updated.

In step 323, a meeting record will automatically be created in the database 111, or alternatively a meeting record will be created in a third-party CRM system and/or in a third-party task management system ("TMS"). The illustrated method 307 ends at step 315, and proceeds via 315 shown in FIG. 3 to step 310, as previously described.

Figure 6:
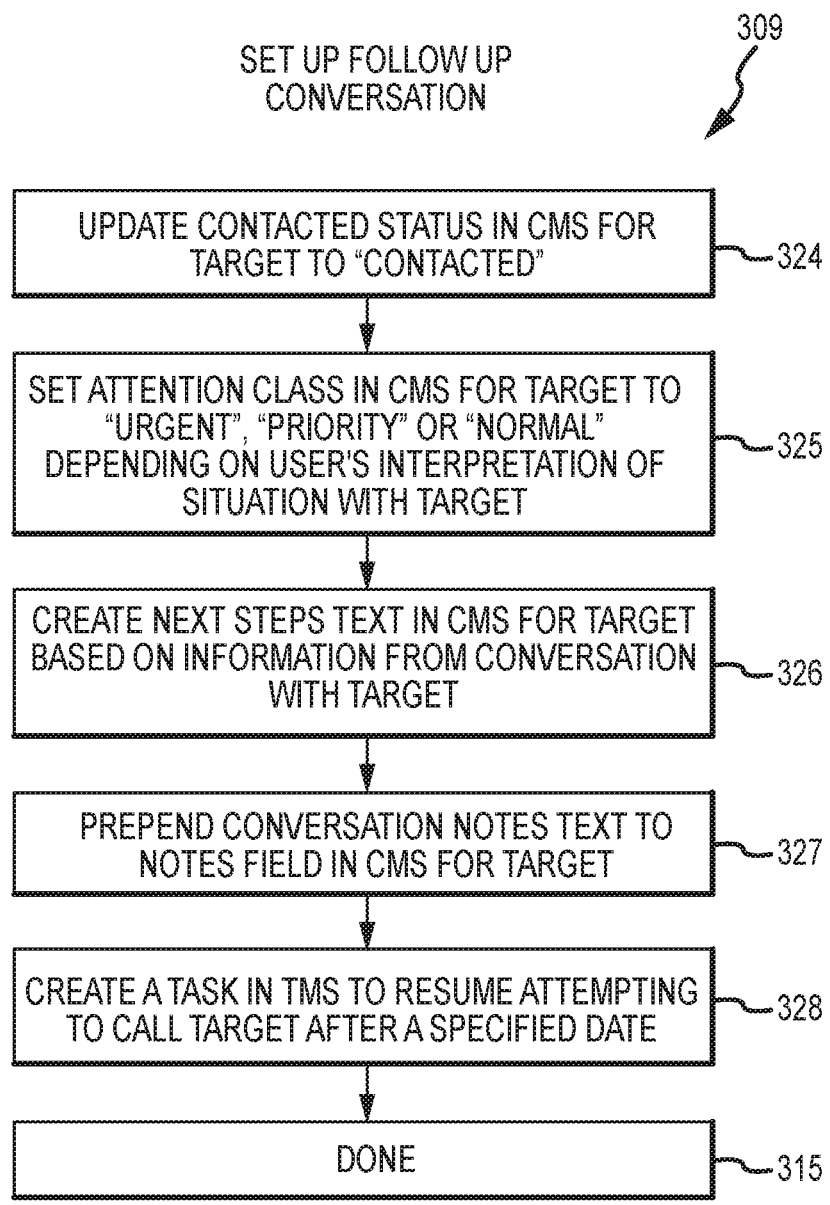
FIG. 6 illustrates a flow chart providing more details for the method of setting up a follow up conversation shown in FIG. 3.

Referring to FIG. 6, a method 309 for setting up the follow up on a conversation with a target 103 is illustrated. In the illustrated example, in step 324, the communication link establishment and management system 100 will automatically update the metadata "status" field for the first target 103*a* to "contacted," and the corresponding metadata stored in the database 111 will be updated. Alternatively, the corresponding metadata stored in a third-party CRM system and/or a third-party contact management system ("CMS") will be updated.

In step 325 shown in FIG. 6, the communication link establishment and management system 100 will selectively update the metadata "attention class" field for the first target 103*a* to "urgent," "priority," or "normal," as appropriate depending on the user 101*a*'s interpretation of the situation based upon the context of the conversation with the first target 103*a*, and the corresponding metadata stored in the database 111 will be updated. Alternatively, the corresponding metadata stored in a third-party CRM system, a third-party contact management system, and/or a third-party task management system will be updated.

In step 326, the metadata for the "next steps" field associated with the target 103*a* will be selectively set by the communication link establishment and management system 100 as appropriate depending on the conversation between the user 101*a* and the target 103*a*, and the metadata will be stored in the database 111. Alternatively, the corresponding information will be stored in a third-party CRM system and/or a third-party contact management system ("CMS").

In step 327, the communication link establishment and management system 100 may automatically prepend conversation notes entered by the user 101*a* into a "notes" field in the database 111 for the target 103*a*, or alternatively, in a "notes" field in a third-party CRM system and/or a third-party contact management system ("CMS"). These conversation notes may entered by the user by issuing verbal commands at the end of the conversation.

In step 328, the communication link establishment and management system 100 will automatically set the metadata in the "wait until" date to an appropriate date after which a follow up call would be appropriate. The communication link establishment and management system 100 will automatically exclude the target 103*a* from any calling lists generated prior to the date set in the "wait until" field. Moreover, the communication link establishment and management system 100 will automatically include the target 103*a* in any calling lists that might otherwise encompass target 103*a* and which are generated after the date set in the "wait until" field. Alternatively, the communication link establishment and management system 100 may automatically create a task to be stored in a third-party CRM system and/or a third-party task management system ("TMS") to resume attempting to call the target 103*a* after a set date. The illustrated method 309 ends at step 315, and proceeds via 315 shown in FIG. 3 to step 310, as previously described.

Figure 7:
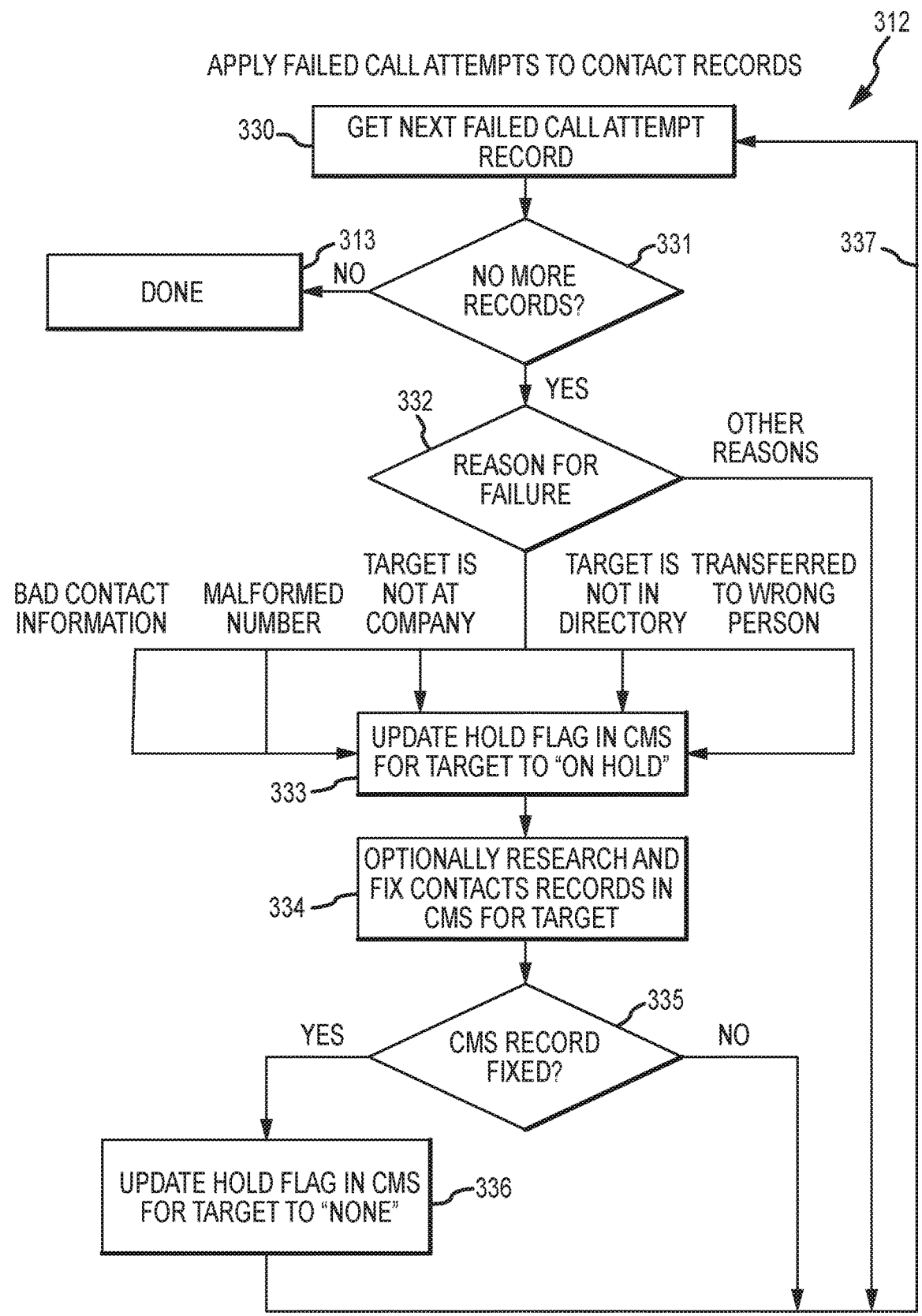
FIG. 7 illustrates a flow chart of a method of applying failed call attempts to contact records shown in FIG. 3.

FIG. 7 illustrates a method 312 for applying failed call attempts to contact records. When all targets 103 have been called, or a calling session is otherwise terminated, the call disposition information for failed calls may be used to automatically update the information stored in the database 111, or alternatively, may be used to update information stored in a third-party CRM system, a third-party contact management system ("CMS"), and/or a third-party task management system ("TMS").

In step 330, the record for the next failed call attempt is retrieved for processing. In step 331, if there are no more records for failed calls, the process proceeds to step 313 and method 312 terminates. If there are more records to process for failed calls, the method proceeds to step 332.

Referring to FIG. 7, in step 332, a determination is made concerning the reason for the failed call attempt. In the illustrated example, a set of predetermined values are provided as reasons for a failed call attempt, including "bad contact information," "malformed number," "target not at company," "target is not in directory," and "transferred to worn number." If the reason for failure is one of a predetermined set of reasons, the communication link establishment and management system 100 may automatically set the appropriate reason for failure record such information in the database 111. Alternatively, similar information may also be stored in a third-party CRM system, a third-party contact management system ("CMS"), and/or a third-party task management system ("TMS").

In step 333, the "hold flag" associated with the target 103*a* will be set to "true" so that the target 103*a* is excluded from any calling lists that are generated until the reason for the failure is fixed. Otherwise, a target 103*a* might repeatedly appear in calling lists, and the system 100 might repeatedly make calling attempts that would fail for the same reason that the present call attempt failed. In step 333, the communication link establishment and management system 100 effectively filters out bad data from a calling list which will improve the efficiency of the operation of the system in the future by eliminating bad contacts from calling lists.

In step 334, the communication link establishment and management system 100 may optionally research and fix contact records for associated targets 103 in the database 111, or in a third-party CRM system or a third-party contact management system ("CMS"). The system 100 may be provided with an AI engine that attempts to access publicly available records to obtain updated information for the target 103*a*, or step 334 may be performed manually. In step 335, if the associated record for the target 103 is fixed, then the method proceeds to step 336 and the "hold flag" is cleared and reset to "false" so that the associated target may be included in a calling list. Thereafter, the method proceeds via 337 back to step 330 to get the next failed call record. In step 332, if the reason for the call failure is a reason other than one of the set of predetermined reasons, then the illustrated method proceeds via 337 back to step 330 to get the next failed call record, and the "hold flag" is not set.

Figure 8:
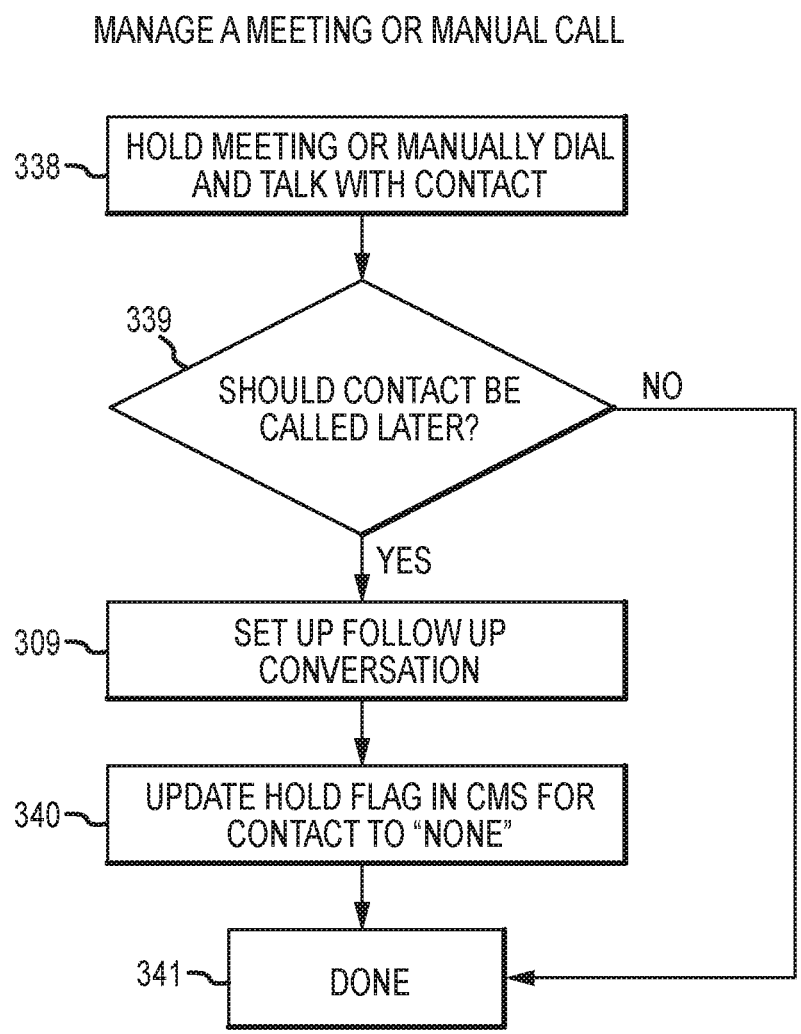
FIG. 8 illustrates a flow chart of a method of managing a meeting or manual call.

FIG. 8 is a flow chart for a method for managing a meeting or manual call. A meeting with a target 103, or a manual phone call or other communication with a target 103, may impact whether that target 103 should be included in a calling list. In accordance with the present invention, a method is provided for updating the information in the database 111 to achieve desired modifications in the operation of the communication link establishment and management system 100 by taking into account the effect of such an event upon the generation of calling lists for the system 100.

Referring to FIG. 8, step 338 represents the meeting or conversation that has taken place with a target 103 outside the operation of an automated calling system 100. In addition to a meeting or manually dialed telephone conversation, step 338 may also represent a telephone call received by the user 101 from the target 103, or may represent an email communication or other correspondence, or may represent one or more text messages. In any event, in step 339, a determination is made whether the target 103 should be called later. If the answer is yes, then a follow up conversation is set up in step 309 shown in FIG. 8. Step 309 is described in more detail in connection with FIG. 6, and will not be further described here. After the completion of step 309 in FIG. 8, the "hold flag" associated with the target 103 will be set to "false" or "none" in step 340. The method illustrated in FIG. 8 ends at step 341.

Referring to FIG. 8, if a determination is made in step 339 that the target should not be called later, then the method proceeds directly from step 339 to step 341 as shown.

Figure 12:
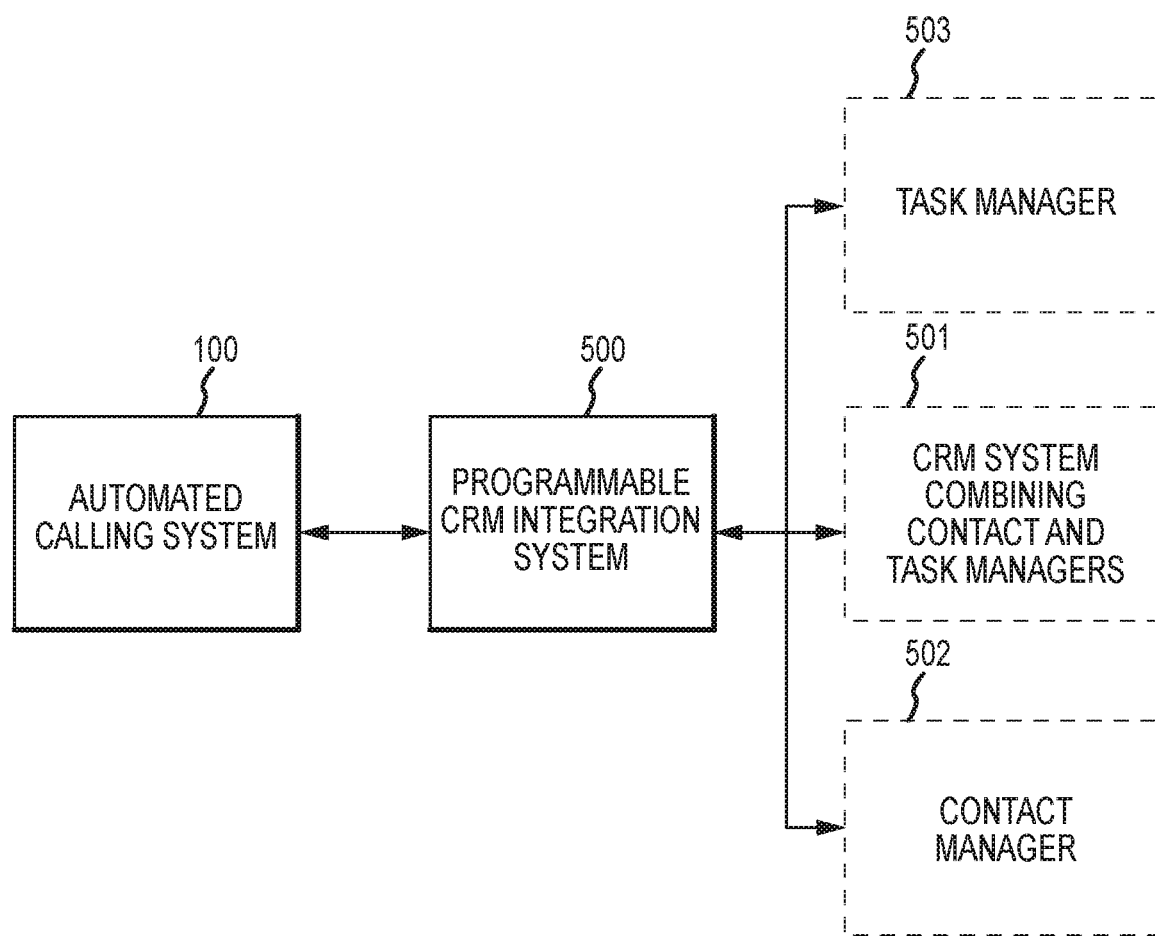
FIG. 12 is a block diagram depicting one embodiment of a programmable CRM integration system for use in a system according to one embodiment described herein.

FIG. 12 depicts a programmable CRM integration system 500 for automatically synchronizing the database 111 in the communication link establishment and management system 100 with a third-party CRM system 501, a third-party contact management system ("CMS") 502, and/or a third-party task management system ("TMS") 503. Data fields in the database 111 may be mapped to corresponding data fields in the third-party CRM system 501, the third-party contact management system ("CMS") 502, and/or the third-party task management system ("TMS") 503. As events take place in connection with the execution of calling sessions by the communication link establishment and management system 100, the programmable CRM integration system 500 is operative to automatically update information in the third-party CRM system 501, the third-party contact management system ("CMS") 502, and/or the third-party task management system ("TMS") 503 so that current and up-to-date information will automatically be propagated to and contained in the third-party CRM system 501, the third-party contact management system ("CMS") 502, and/or the third-party task management system ("TMS") 503 at all times.

Figure 9:
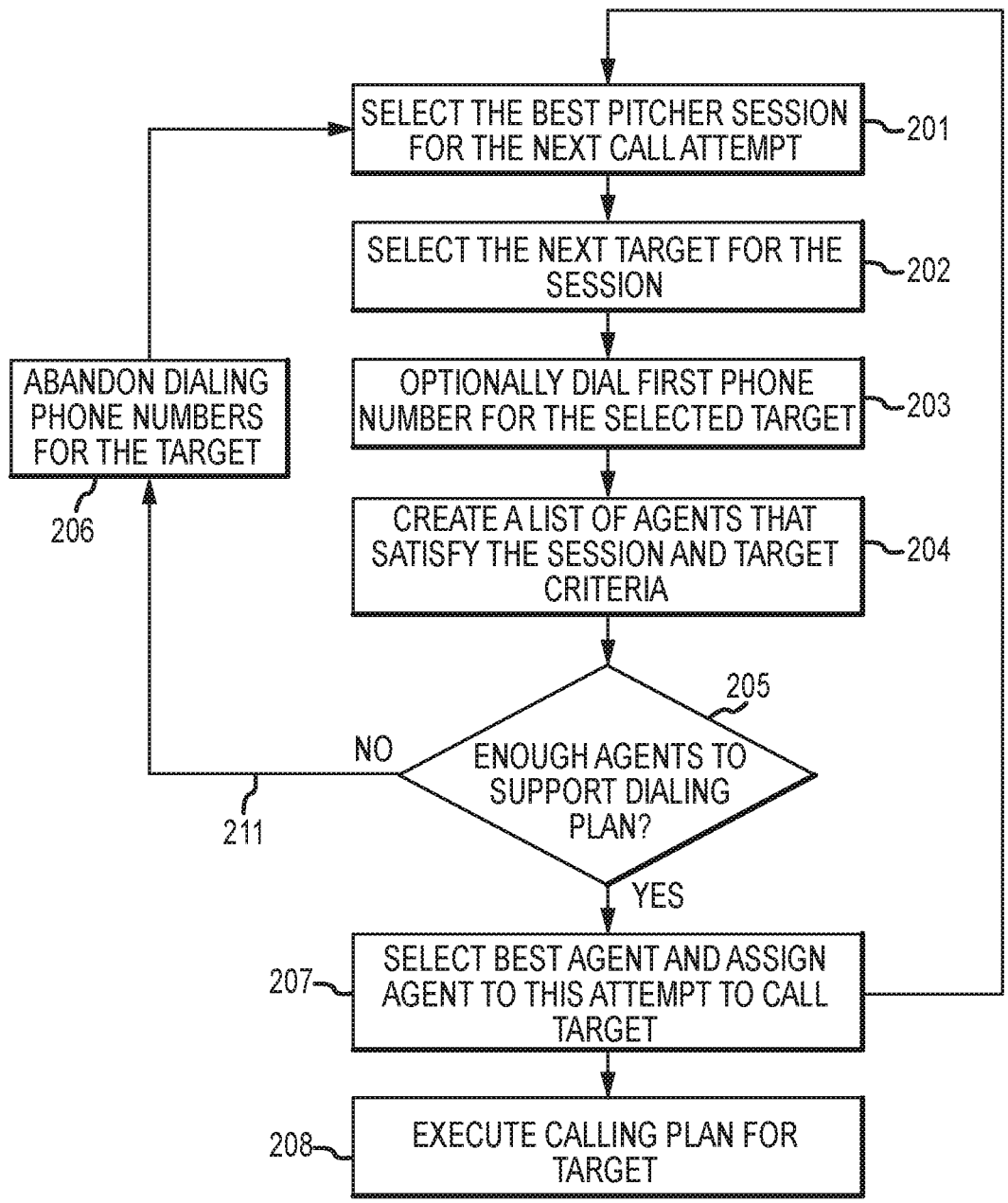
FIG. 9 illustrates a flow chart of a method of dynamically allocating agents.

FIG. 9 illustrates a flow chart of one method of dynamically allocating agents according to one embodiment described herein. The method described in FIG. 9, indicated generally with reference numeral 200, illustrates how the various components of the system 100 work together in one embodiment to selectively dial telephone numbers from a list of targets or contacts 103 with whom communication is desired.

The communication link establishment and management system 100 operates in a continuous loop as shown in FIG. 9. As shown, at step 201, the current set of calling users 101, or pitchers 101, is scanned to find the most appropriate pitcher 101 to make the next call attempt on behalf of his or her company (in this example, the company has products or services to sell). This user or pitcher 101 can be selected according to various configurable rules or user selection criteria, which may be modified while the system 100 is operating, such as: length of time since this user 101 last had a call attempt; number of successful connections per unit time in the session so far; anticipated difficulty in achieving the guarantee of a predetermined target number of conversational connections for this user 101 based on the ratio of successful connections to failed connections, and optional factors including the mean and median times to complete call attempts during the session so far; as well as optional factors such as the business priority of the session to achieve goals such as enhanced customer satisfaction for specific customers 103, or effectiveness of system demonstrations.

In the illustrated embodiment, at step 202, when a pitcher 101 is identified, the system 100 scans the pitcher's calling list for the next phone number to attempt to call. This number can be selected based on configurable rules that can include: choosing the next number in randomly assigned order that satisfies call pacing constraints optionally including a minimum duration between attempts to call the same number and a maximum number of calls to any one number during a session or other predetermined period of time; a next number in order of defined priority, or within a set of numbers sharing the same priority, that satisfy call pacing constraints; or a number selected by the user 101 during the session and marked as highest priority to be attempted next.

In one embodiment, an optional step 203 may be performed which dials the first telephone number for the selected target at this stage of the process.

When a next number to attempt is selected, at step 204, the list of agents 102 is scanned to identify at least one agent 102 to whom the attempt can be assigned. This agent 102 can be optionally locked to the attempt at this point, or can be left unlocked until one of a configurable set of conditions occurs, such as the telephone system detects that the call was answered. The agent 102 may therefore be optionally locked onto the attempt at various points in the process, depending on the rules configuration. These can include: when dialing begins; when dialing is completed; when the call is answered by a human being or voice mail greeting rather than an IVR system; and when the call is answered by an IVR system. An agent 102 is not assigned to the call attempt if it is for an invalid number, there is no answer, a busy signal is detected, or the call is answered by a fax machine.

In step 205, a determination is made concerning whether sufficient agents 102 are currently available. If there are no agents 102 that match the criteria required for the next attempt for a given, or there are an insufficient number of agents 102 available for the current number of simultaneous calls in progress, in step 205 the method branches via 211 to step 206, where the previously telephone number is abandoned, and then the method proceeds back to step 201, and a next pitcher 101 is identified according to the prioritization rules described above. For example, if the next pitcher 101 according to the prioritization rules requires a German speaking agent 102, and all German speaking agents 102 in the overall agent pool are currently locked on to call attempts, the list of pitchers 101 is re-scanned and a pitcher 101 with the second highest score according to the prioritization rules is selected for the next call attempt in step 201.

Because the best agent 102 preferably is not locked on to the attempt until one of the configurable set of positive call outcomes happens, it is possible that a tentatively selected first agent 102a becomes unavailable by being assigned to another call attempt that was happening in parallel. In this case, the list of agents 102 is scanned again to find a second agent 102b with the next best score according to predetermined agent assignment rules. Among the agents 102 that match the criteria for the next call attempt for the selected session, additional selection criteria may be applied to select the best agent 102 available. These criteria may include such factors as the labor cost of the agent 102, the agent's historical efficiency at generating connections, and meeting requirements to fairly distribute calls to agents 102 or meet obligations for minimum use of agents 102 provided by different vendors. In step 205, if no suitable agent 102 is available, the call attempt is disconnected and abandoned in step 206, and the system 100 returns to the outer loop at step 201 to select the best pitcher 101 for the next call attempt.

Once a first agent 102a is successfully associated with a first call attempt at step 207, the communication link establishment and management system 100 operates in parallel fashion, and the system 100 immediately proceeds back via 210 to begin a second call attempt at step 201 that may potentially involve the association of a second agent 102b. Simultaneously, the first agent 102a who was successfully associated with the first call attempt proceeds to take actions to process the first call attempt. This parallel functionality of the communication link establishment and management system 100 is a critical feature of the present invention, and this parallel functionality provides many significant advantages over prior systems that did not include such capability.

When a call attempt is assigned to an agent 102 in step 207, the agent 102 performs actions depending on the conditions associated with that particular call attempt in order to establish a communication link with the desired target person 103. This is illustrated in FIG. 9 by step 208, in which the calling plan for the associated target 103 is executed. In the illustrated example, the agent 102 is connected to the telephone call, and simultaneously presented with a screen display of information associated with the target 103, such as the target person's name, job title, company name, as well as other identifying information. As an example of the actions performed by the agent 102, if the call is answered by a gatekeeper, such as a secretary or administrative assistant, the agent 102 would ask to speak to the target person 103. If the call is answered by an IVR system, the agent 102 could respond to the IVR system in an appropriate fashion to obtain a connection to the desired target person 103. However, it should be appreciated that the system 100 performs certain functions during the execution of the calling plan step 208 shown in FIG. 9.

In one embodiment, each agent 102 that is defined in the system may be described in a stored profile that includes a list of skills, such as languages spoken and understood, experience level, skills and training, certifications, along with optional proficiency scores for each skill and a score representing the agent's quality rating, based upon his or her historical success rate in achieving correct connections, normalized for the overall quality of calling lists for those past sessions. When an agent 102 logs into the communication link establishment and management system 100, the agent's identifier, session identifier, skills profile and quality score are recorded in a data structure that includes all currently available agents 102.

Target characteristic information associated with each target 103 may be stored in a database 111. During a calling session, this target characteristic information may be used in determining the best agent 102 to handle a calling attempt directed to that target 103. When the assistance of an agent 102 is needed to further process an attempted call to a particular target 103, the agent characteristic information may be compared with the target characteristic information, and a determination can be made to select the best available agent 102 based upon the results of such a comparison. For example, if the target 103 is a high priority high-level executive, an agent 102 may be selected who has the best performance rating of all available agents, or who has the greatest experience. If the target 103 speaks Japanese, for example, then the agent characteristic information may be used to select an agent 102 who speaks Japanese.

FIG. 10 is a state table that illustrates in more detail the functionality and steps involved in the execution of a calling plan 208. The functionality involved in the execution of a calling plan may involve a number of different states and multiple possible sequences of states, and is best explained with a state table rather than a flow chart. FIG. 10 contains a left column 215 setting forth possible call states, and the middle column 216 sets forth the next step that potentially follows the associated call state. The right column 217 indicates whether the associated step is done by the agent 102, or automatically by the system 100, and in some instances, the associated step may be performed by either or both.

Referring to FIG. 10, in the first row 218, if the call is answered by a voice, an agent 102 is dynamically selected and assigned to this call attempt, and the agent 102 or the system 100 may categorize the call attempt as reaching a live person, an automated attendant or company directory, or a voice message greeting. The ability of a human agent 102 to make such a determination is apparent.

However, in an alternative embodiment, instead of a human agent 102 making the determination indicated in the first row 218 of the table, the communication link establishment and management system 100 may include a voice recognition software module, and an artificial intelligence or AI module, that are operative to decode the speech and ascertain what words were spoken by a live person, or an automated attendant, or a voicemail greeting, and automatically determine the correct state in the middle column 216 of the first row 218 that applies to this call attempt. The AI module may detect the language spoken by the voice answering the telephone, whether it is a live person, an automated attendant, or a voicemail greeting, and record the detected language in a record associated with the target 103 in the database 111. When the best agent 102 is selected in step 207 shown in FIG. 9, the language skills of the available agents may be compared with the language detected by the AI, or compared with stored information in the database 111 concerning the languages spoken by the target 103, and an agent 102 may be selected in step 207 that speaks the same language that is spoken by the target 103.

The AI module may include a database containing hash values for decoded voice recordings, and may include the functionality of recognizing when the same recording answers a telephone. The database may store information associated with a telephone answered by a particular voice recording, such as a record of the correct signals to transmit to an associated IVR system in order to navigate the IVR system or the correct signals to navigate a company directory associated with that recording. A sophisticated voice recognition AI module and database may be included to recognize the voice of the target person 103 in the event that the target person 103 answers the phone, and in some such instances, may complete the call between a user 101 and such target person 103 without any need for an agent 102.

Referring to FIG. 10, instances where a call is connected to the target person 103, the call state is depicted in the fourth row 221 of the left column 215. When that state is reached, the agent 102 (or the system 100 if automatic operation capability is provided) immediately transfers the call to an appropriate user 101, and the disposition of the call is recorded in an associated database as a successful communication link. In the event of a successful call disposition, the call state changes to the state indicated in the seventeenth row 234 of FIG. 10.

The second row 219 in FIG. 10 illustrates the state of a call that is answered by a live person, rather than a recording. It will be appreciated that the second row 219 is one state that is a possible outcome from the state explained above with respect to the first row 218 in FIG. 10. In this case 219, the agent 102 would typically determine whether the live person is a gatekeeper, is the target 103, or is some other person. However, as described above, a voice recognition AI module and database may be provided with the capability of recognizing the voice of the target person 103, or the voice of the target's regular gatekeeper, (such as the target's normal administrative assistant), and the determination described in the middle column 216 of the second row 219 may be determined automatically by the system 100.

An agent 102 may be provided with a script to use when a call attempt is answered by a gatekeeper. In addition, the agent 102 may be able to answer questions and to provide the gatekeeper with additional information concerning the purpose of the call. If the call attempt is answered by a gatekeeper, the call state is depicted in the left column 215 of the third row 220 shown in FIG. 10. In the illustrated example 220, the agent 102 would read or recite a predetermined greeting or script to the gatekeeper.

Referring to FIG. 10, if the call state is a connection to someone else, as depicted in row five 222 of the left column 215, (for example, the telephone number provided in the calling list may be a wrong number or the target person may not work there any longer), the agent 102 records in an associated database 111 that the call attempt failed, and may save additional details relating to the call disposition.

If the call state is that the call is connected to a company directory, as indicated in the sixth row 223 of the left column 215 in FIG. 10, the next step in the method according to one embodiment is to determine whether the target 103 is in the company directory. This may be done by the agent 102. In addition, an AI module with voice recognition functionality may perform the same step automatically, with the system 100 making that determination.

If the target is determined to be in the company directory, then the call state goes to the state indicated in the seventh row 224 of the left column 215 of FIG. 10. The appropriate signals are transmitted to the company telephone system, typically in the form of touch tones sent to a PBX, to cause the company PBX to connect the call to the extension corresponding to the target 103. This step may be performed by the agent 102, or may be performed automatically by the system 100 in an embodiment having an AI module and a voice recognition module. Alternatively, previous calling experience with a particular telephone number may be saved in the database 111, and in the case of a main number to a business having a known automated attendant system whose commands are saved in the database, the system 100 may recognize when a telephone number is being called that it is a known automated attendant system. If the command structure for a known automated attendant system is saved in the database 111, the system 100 may proceed to automatically issue commands to the company's automated attendant system to cause the company PBX to transfer the call to the extension associated with the target 103 without connecting to an agent 102. Such functionality may be accomplished without an advanced AI module or voice recognition module.

Another outcome from the state indicated in row 223 is that the target is not contained in the company directory. In that event, the call state changes to the eighth row 225 of the left column 215 depicted in FIG. 10. The next step of the method according to one embodiment would be to record in the database 111 the call disposition as failed, and further record in the database additional information associated with the failed call attempt, such as the characteristic that the target 103 was not in the company directory.

One outcome of the call state in the first row 218 of FIG. 10 is that the voice turns out to be a voicemail greeting. In that event, the call state changes to the state indicated in the ninth row 226 of the left column 215 of FIG. 10. The agent 102, or in the case of an embodiment featuring automated operation the system 100, may check to determine whether there is a predetermined voicemail message recorded for this calling session and applicable to this target 103. If so, the system 100 may automatically take over the process of leaving a voicemail message for the target 103, and after detecting a tone indicating the beginning of a recording session by the target's company voicemail system, the system 100 will play the predetermined voicemail message in order for the message to be recorded by the company voicemail system. Upon completion of the voicemail message, the system 100 will terminate the call, and the call state changes to the state indicated in the seventeenth row 234 of FIG. 10.

One possible call state is that a busy signal is detected, as indicated in the tenth row 227 of FIG. 10. The next step will be performed automatically by the system 100. The busy signal is automatically detected by the system 100 without any intervention by an agent 102, and the system 100 automatically stores data relating to the call disposition in the database 111. In this case, a record indicating that the call attempt failed is stored, and associated information is stored in the database 111 showing that the call failed because of a busy signal. The call state then changes to the state indicated in the fourteenth row 231 of FIG. 10. In addition, the system 100 may also provide a means for adding the associated telephone number back in the list of numbers to be called during the current session in an effort to re-dial the number and again attempt a call to that number. Alternatively, the call disposition information stored in the database 111 may be queried at a later date to generate a calling list for a subsequent calling session that is intended to re-dial telephone numbers with certain associated call disposition characteristics, such as a list of call failures that were due to busy numbers on previous attempts.

Another possible call state is that the call attempt resulted in being connected to a facsimile machine, as indicated in the eleventh row 228 of FIG. 10. The system 100 automatically detects the facsimile machine, and stores call disposition information in the database 111 that the call failed due to the fact that the telephone number called was for a facsimile machine. The call state then changes to the state indicated in the fourteenth row 231 of FIG. 10.

As indicated in the twelfth row 229 of FIG. 10, in the case of no answer, the system 100 stores call disposition information in the database 111 that the call failed due to the fact that the telephone number called was not answered. The call state then changes to the state indicated in the fourteenth row 231 of FIG. 10.

If the call attempt resulted in a determination that the telephone number in the calling list was a malformed number, as indicated in the thirteenth row 230 of FIG. 10, the system automatically records in the database 111 a call disposition indicating the there was a data error associated with the telephone number. The call state then changes to the state indicated in the fourteenth row 231 of FIG. 10.

When the call state is a failed call attempt, as indicated in the fourteenth row 231 of FIG. 10, the system 100 automatically checks to determine whether the database 111 or the calling list contains any other numbers for the target 103. If an alternate number is found, the call state changes to the state indicated in the fifteenth row 232 of FIG. 10, and an alternate number is dialed. If an alternate number is not found, the call state changes to the state indicated in the sixteenth row 233 of FIG. 10, and the disposition of the calling attempt would be indicated as failed, and this information would be stored in the database 111.

In the event of any successful call disposition, the call state changes to the state indicated in the seventeenth row 234 of FIG. 10. In that event, the system 100 releases any associated or selected agent 102 and terminates the calling plan with a success status stored in the database associated with the target 103. The system 100 may then loop back to begin another call attempt at step 201 in FIG. 9.

FIG. 11 shows a screenshot of an example of a screen display 400 presented to an agent 102 when the agent 102 is connected to a call attempt in progress. The display 400 illustrated in FIG. 11 provides the agent 102 with identifying data for the target 103, such as the target's first name 401, last name 402, job title 403, and telephone number 404. (A fictitious telephone number is illustrated in FIG. 11.) The company 405 associated with the target 103 is also preferably displayed to the agent 102.

The agent 102 is preferably also provided with information associated with the user or pitcher 101 tentatively selected for this call, if the call attempt is successful. User associated information may be displayed in user display box 416. For example, if a call is answered by an operator or gatekeeper, the agent 102 can ask if the target person 103 is available to speak with the designated user 101, and the agent 102 can identify the designated user 101 by name (and company if applicable). For example, the agent 102 would be able to ask if "Mr. Chris Smith is available to speak with Mr. Jim Jones," assuming the user 101 is Jim Jones and the user's name is displayed to the agent 102 in the user display box 416.

If the agent 102 is successful at reaching the first target person 103a, the agent 102 clicks on the transfer button 406, and the call is transferred to an appropriate user 101. The transfer signal resulting from the agent 102 clicking on the transfer button 406 is handled by the connection management module 113 shown in FIG. 2. The agent 102 is then immediately free to enter data concerning the call disposition and then handle another call attempt associated with a second target person 103b. This method results in optimum utilization of the agent 102, and the agent 102 is involved with a call attempt only during a limited time period when the assistance and involvement of a human agent 102 is required. All other steps associated with a call attempt are performed automatically by the system 100.

Referring to FIG. 11, if instead of reaching the target person 103, the agent 102 is referred to, or otherwise reaches a voicemail for the desired target 103, the agent 102 may optionally click on the leave voicemail message button 407. In a preferred embodiment, a prerecorded voicemail message is automatically left by the system 100, and the agent 102 is freed up immediately after clicking on the leave voicemail message button 407 to enter data concerning the call disposition and then take another call attempt. When the agent 102 clicks on the leave voicemail message button 407, the system 100 waits on the target's voicemail system and spends the time necessary to automatically record a predetermined voicemail message without further human intervention or involvement.

There may be some instances when it is desirable for an agent 102 to be capable of hanging up on a call in progress, and in the illustrated embodiment, the agent 102 may do so by clicking on a hang up button 415. In some instances, for example when the agent 102 is speaking to someone over a cellular phone and the target's cell phone drops the call, the agent 102 can hang up and redial the number by clicking on the redial button 414.

Before the agent 102 is available to be connected to another call attempt, the agent 102 preferably enters call disposition data that is stored in a database or data store. A drop down menu 408 may be provided from which the agent may select an appropriate call disposition instance and record the data by clicking on an associated call disposition submit button 409. An agent 102 may also be provided with a popup window 410 that provides a selection of possible characteristics for system quality, lead quality, and call report, which may be recorded by the agent 102 and submitted by clicking on call data record button 411. In the illustrated example, available system quality characteristics that may be recorded include "no one there," "dropped call," "delayed transfer," "poor voice quality," "voice late," and "lead late." Lead quality characteristics provided in this example include "bad number," "inappropriate company,"

"inappropriate title," and "bad information." In the illustrated example, call report data that may be recorded in a data store includes "person answered," "IVR answered," "fax answered," "direct number," and "IVR navigation success." These examples are illustrative only, and a person skilled in the art will appreciate that many other outcomes and characteristics may be provided for the agent 102 to optionally record.

An agent 102 may also type notes associated with a call attempt in a text box 412, and save the notes by clicking on notes save button 413. The notes typed by the agent 102 will be saved in a data store within a database so that the notes are associated with the target or customer 103. Moreover, when a call in progress is referred to a second agent 102*b*, any previously typed notes saved by a first agent 102*a* may be displayed to the second agent 102*b* in the notes window 412.

The screen display 400 shown in FIG. 11 is illustrative only, and persons skilled in the art will appreciate that different configurations and arrangements may be provided for an agent display screen in accordance with the spirit and scope of the present invention.

The example shown in FIG. 1 is illustrative of one embodiment. The public switched telephone network 104 may be replaced, in whole or in part, with a network 104, such as the Internet 104. The system 100 may include a user device operated by the user 101, such as a client computer connected to a network employing client-server architecture. The system 100 preferably includes a server and a database store 111. The server and the database 111 are preferably integrated into one physical device, but other arrangements are possible. Alternatively, the server and the database 111 may be integrated, while the user device is remote, for example, a client computer or tablet device running a browser that communicates with the system 100 over a network using TCP/IP protocol. Alternatively, the server running the system 100 and a separate server containing the database 111, may communicate with each other via a local area network or a wide area network, including the Internet. An ordinary artisan will understand that that the system 100 illustrated in FIG. 1 is only one example, that many other configurations are possible and further, duplicative components may be eliminated where possible.

A server suitable for implementing the system 100 may comprise a computing device, and may include a processor, a memory, a network interface, and appropriate software. The database 111 may be stored on a server comprising a computing device, and may include a processor, a memory, a network interface, a database module, and a data storage device such as a hard drive.

The system 100 may enforce call processing and connection rules and may be tasked with controlling a second separate third-party database containing contact associated information, and may be provided with the necessary privileges and authorization to make changes to the third-party database associated with thereof. The communication link establishment and management system 100 may interface with conventional customer relationship management programs and databases, such as salesforce.com and the like, in order to provide the functionality and advantages of the present invention without requiring a business to discard its existing tools and software, and without requiring expensive and disruptive software replacements and upgrades. For example, the system may include a server operative to create database records in a database 111 associating results of connected calls, unsuccessful call attempts, bad telephone numbers, and information obtained from communications with person(s) contacted.

More particularly, in response to receiving information during and as a result of a connection or unsuccessful attempt at a connection, calling process functionality may be employed. The system 100 may use the information in the database 111 to create additional lists and new groups of telephone numbers for other purposes, such as follow up calls or re-attempts, and/or make changes and updates to the current customer relationship information in conventional customer relationship management programs and databases, such as salesforce.com and the like. Further, the system 100 may use call disposition data to improve the quality of calling lists, for example, by deleting bad telephone numbers, by changing the telephone numbers for a target person 103 when the target 103 changes jobs or moves to a different location, by storing the necessary sequence of touch tones that must be generated in order to navigate an automated attendant at a particular target's telephone number in order to reach the desired target 103, etc. In practice, the quality of information in any set of contacts or calling list degrades over time, because people change jobs, their business moves to a new location, they are promoted to a new position or change job responsibilities with the same company, they retire, they change their name (for example, as a result of a marriage or a divorce), or a person may be deceased. One by-product of the operation of the system 100 is to improve the quality of the information in a set of contacts or calling list by eliminating or updating incorrect information.

The database 111 preferably stores information associated with individual targets 103 that may be discovered during calling sessions. For example, the telephone number that a target 103 is most likely to answer may be stored. The language(s) spoken by the target 103 may be stored in the database 111.

The actual time zone where the target 103 is located is also stored. Prior to the widespread use of mobile phones, telephone numbers were associated with physical locations, and the area code associated with the telephone number would uniquely identify the time zone where the telephone was located. A new paradigm has emerged with the widespread use of cellular telephones, and now a telephone number is associated with a person instead of a physical location. Because people are mobile, the area code of a cellular telephone number is not a reliable indication of the time zone where the person associated with the cellular telephone number is located. In addition, a cellular telephone subscriber may not want to change telephone numbers when the subscriber moves to a different area code, and there is no requirement that a subscriber must do so. Therefore, because contact information associated with a target 103 frequently includes mobile telephone numbers, the area code of a telephone number associated with a target 103 does not always match the time zone where the target 103 may be located when an attempted call is made to the target 103.

The database 111 may store customer relationship and contact information, index information for the customer contacts and relationships, contact database element relationships and contact relationship element component related information. In addition, the database 111 may store authentication, template definitions, and/or business rules. Given that the database 111 stores useful and valuable information as a by-product of the operation of the system 100, the information that is collected, verified, and updated in the database 111 can be used by a second business having a calling list that overlaps with a previous calling list from a first business, and at least some of the targets 103 or telephone numbers are the same. For example, the first business might conduct a calling session using a calling list that included a number of targets 103 for which the only telephone number available was the main telephone number for a large corporation, and each such target 103 required navigation of the company directory or other efforts were required to obtain a direct dial number for the targets 103. Thereafter, a second business might conduct a calling session that includes targets 103 with the same large corporation, and which only have the main telephone number provided. The system 100 may conduct the calling session for the second business more efficiently by taking advantage of any direct dial numbers obtained for common targets 103 who were on the calling list for the first business, and by recording information concerning the navigation of the company directory to more quickly locate the targets 103 at that telephone number for whom no direct dial number is available. If the system 100 is used by a number of businesses in an industry, the system 100 may, as a by-product of the upgrading and updating of contact information that occurs during operation of the system 100, effectively produce a database 111 of contact information that is more current and of a higher quality than any conventional telephone book or published directory.

Figure 13:
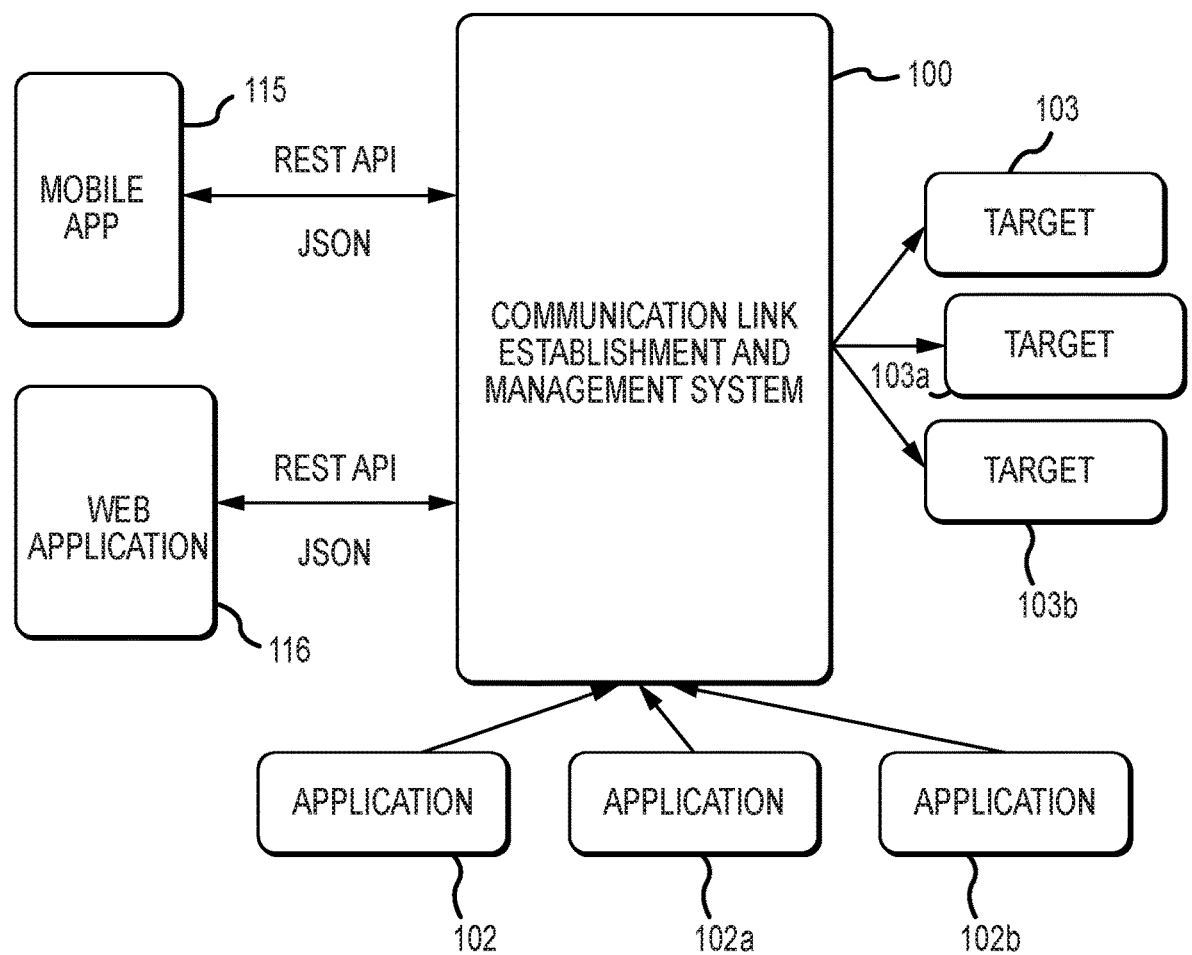
FIG. 13 is a block diagram depicting a system according to an embodiment including a mobile application and a web application.

An improved embodiment of the invention provides a mobile application 115 for a wireless handheld computing device such as a smartphone, as illustrated in FIG. 13. The mobile application 115 provides an effective way for a user 101 to conveniently take advantage of the power and efficiency of the communication link establishment and management system 100 anywhere and anytime. This may increase productivity significantly by taking advantage of time that might otherwise be wasted or lost. A typical user 101 will often have a smartphone or other wireless handheld computing device with him or her at all times, and using the mobile application 115, can access the communication link establishment and management system 100 to establish communication with a target 103.

When the mobile application 115 is used with the communication link establishment and management system 100, the communication link establishment and management system 100 is preferably linked to a customer relationship management ("CRM") system 501, 502 or 503, as illustrated in FIG. 12.

Referring to FIG. 13, the mobile application 115 communicates with the communication link establishment and management system 100 using a REST API (application programming interface). REST, or Representational State Transfer, is a software architectural style that defines a set of constraints to be used for creating web services. Web services that conform to the REST architectural style, termed RESTful web services, provide interoperability between computer systems on the Internet. RESTful web services allow the requesting systems to access and manipulate textual representations of web resources by using a uniform and predefined set of stateless operations, as is known to those skilled in the art. The REST API used in the mobile application 115 defines a set of functions which can be used to perform requests and receive responses via HTTP protocol, such as GET and POST. The World Wide Web is an example of a distributed system that uses REST protocol architecture to provide a hypermedia driven interface for websites. The mobile application 115 uses REST APIs to make requests for logging in a user 101, to get calling list details from the communication link establishment and management system 100, to initiate dialing assisted by an agent 102, and also dispose calls in a manner consistent with how users 101 wish to call the targets 103 subsequently, or otherwise dispose calls to indicate that a particular target 103 should not be called in the future, or should not be called again until after a predetermined date or after a predetermined amount of time has passed.

The mobile application 115 uses a JSON format to exchange data with the communication link establishment and management system 100. JSON, or JavaScript Object Notation, is a lightweight data-interchange format known to those skilled in the art. The JSON format is preferred because it is easy for humans to read and write, and it is easy for machines to parse and generate. It is based on a subset of the JavaScript Programming Language, Standard ECMA-262 3rd Edition—December 1999. The mobile application 115 uses JSON format to send request parameters and to receive response data from the communication link establishment and management system 100.

In the mobile application 115, the interaction of a user 101 with the communication link establishment and management system 100 is preferably via voice interactions, instead of using a keyboard and mouse, like a user 101 would typically use with a web browser running on a personal computer. Using the mobile application 115, a list of calling lists is communicated from the communication link establishment and management system 100 to the portable device 115. A desired calling list is selected by the user 101 on the portable device 115, and the selected calling list is communicated to the communication link establishment and management system 100. The communication link establishment and management system 100 then executes all the calling until a connection is made either with a target 103 on the calling list (in the fully-navigated mode of operation), or any live human who answers a called phone number (in the connect-on-live-voice mode of operation). The contact information associated with the connected person 103, and any supporting information from the CRM 501, 502 or 503 for that contact 103, is communicated by the communication link establishment and management system 100 to the portable device to be displayed on its screen, with the name and other information about the contact 103 being optionally spoken by synthesized voice or playing of a recording. When the conversation is finished, a call wrap-up screen is displayed on the portable device 115, and one disposition is selected from a configurable list of dispositions from the CRM that have also been communicated to the portable device 115. Additionally, the user 101 can enter call notes, select a follow-up date, and enter a follow-up script to be used in a possible subsequent conversation—with all of this information communicated from the portable device 115 to the communication link establishment and management system 100. In addition, the communication link establishment and management system 100 automatically updates the CRM to record that the call took place, with whom, what was its duration and call disposition outcome, and what is the resulting status of the contact, plus an optional follow up task to make sure any future call attempts are made after a specified interval, and that any conversation resulting from those follow-up call attempts is informed by displaying a script to help start the next conversation as a continuation of the prior conversation.

The communication link establishment and management system 100, in combination with the mobile application 115, operates in a loop, continuing onto further dialing on the selected list after each conversation, unless a command is received by the communication link establishment and management system 100 to stop calling, either by the user 101 logging off the mobile application 115, or by pausing the calling session.

Figure 14:
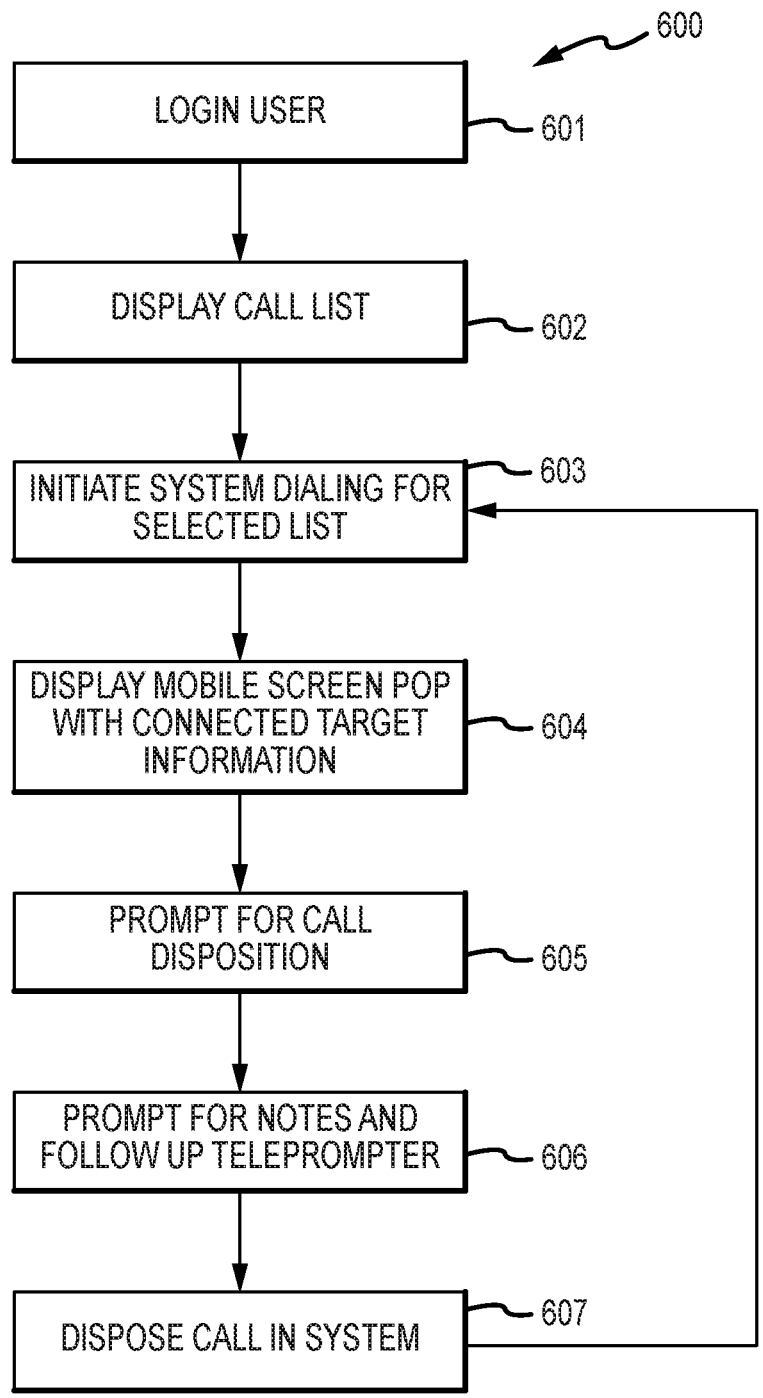
FIG. 14 illustrates a flow chart of a method for a mobile application running on a wireless handheld computing device, such as a smartphone.
Figure 15:
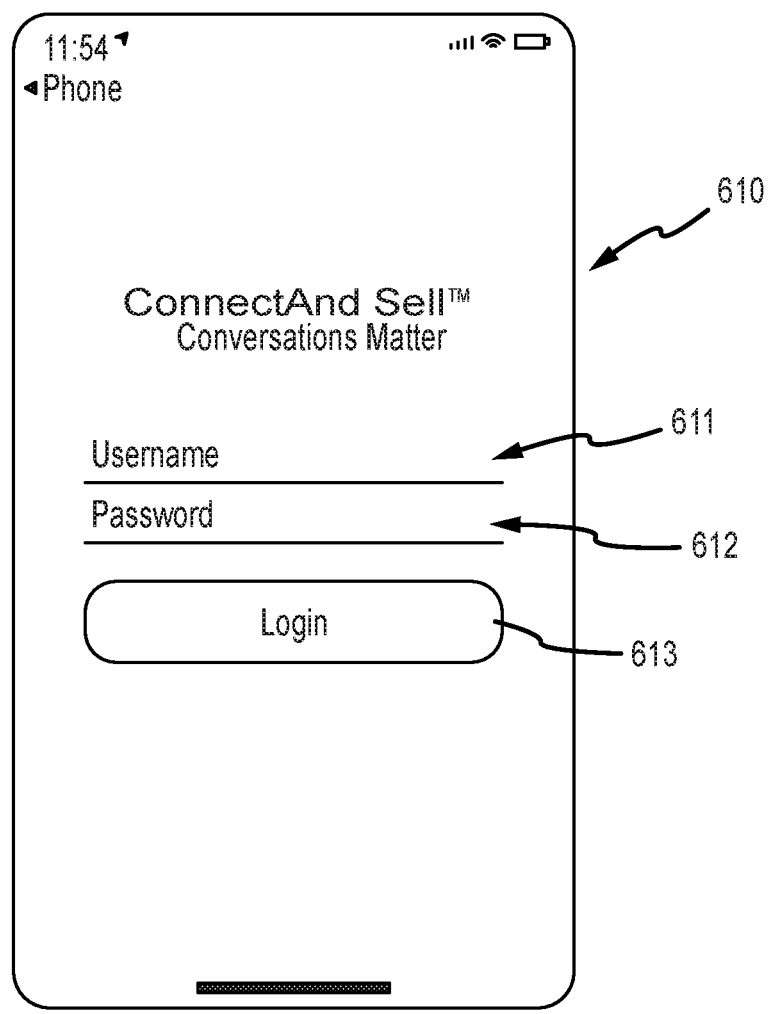
FIG. 15 is a screen display of a login screen for a mobile application according to one embodiment.
Figure 16:
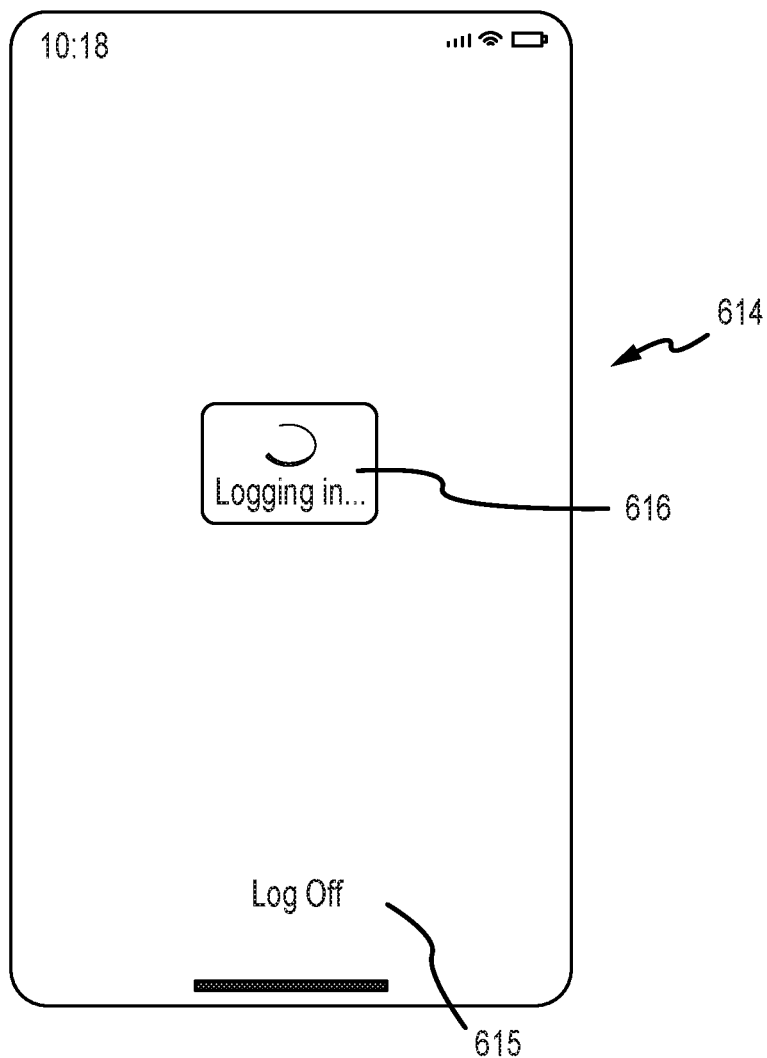
FIG. 16 is a screen display used for a mobile application according to the embodiment illustrated in FIG. 15.

FIG. 14 provides a flow chart for a method 600 employing the mobile application 115 in accordance with the present invention is shown. One embodiment of steps associated with a method 600 of executing a calling session using the mobile application 115 running on a wireless handheld computing device is shown in FIG. 14. In step 601, a user 101 employs a login process to gain access to the mobile application 115. In step 601, the mobile application 115 displays a login screen 610 to the user 101, as shown in FIG. 15. A username field 611 and password field 612 are provided for the user 101 to enter identifying information to authenticate the identity of the user 101 and to verify that access to the communication link establishment and management system 100 is authorized. Referring to FIG. 15, when the user 101 has entered appropriate credential information identifying the user 101, the user 101 may initiate the login process by pressing a login button 613 on the screen of the wireless handheld computing device 115, or by voice command. The credential information identifying the user 101 is communicated to the communication link establishment and management system 100, to be compared with data for authorized users stored in database 111. While the credential information is being transmitted and verified, the wireless handheld computing device may display the screen 614 shown in FIG. 16. A "logging in" message 616 may be displayed to the user 101. The user 101 may terminate the login step 601 using a "Log Off" button 615 provided on screen 614.

Figure 17:
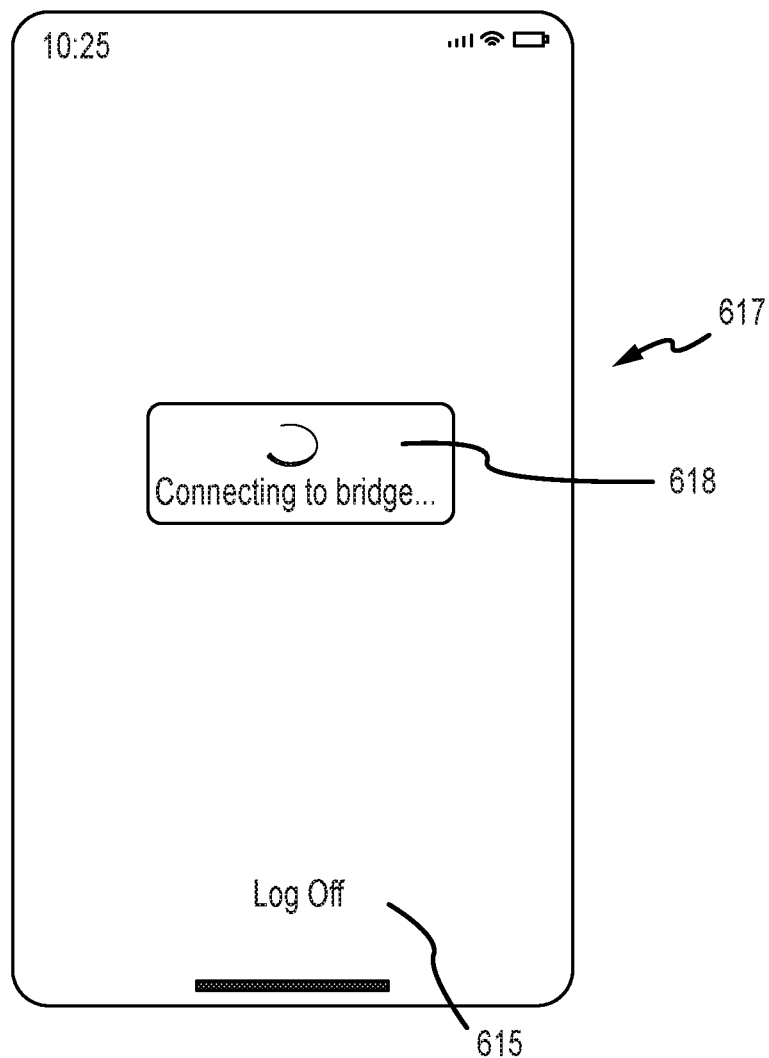
FIG. 17 is a screen display used for a mobile application according to the embodiment illustrated in FIG. 15.
Figure 18:
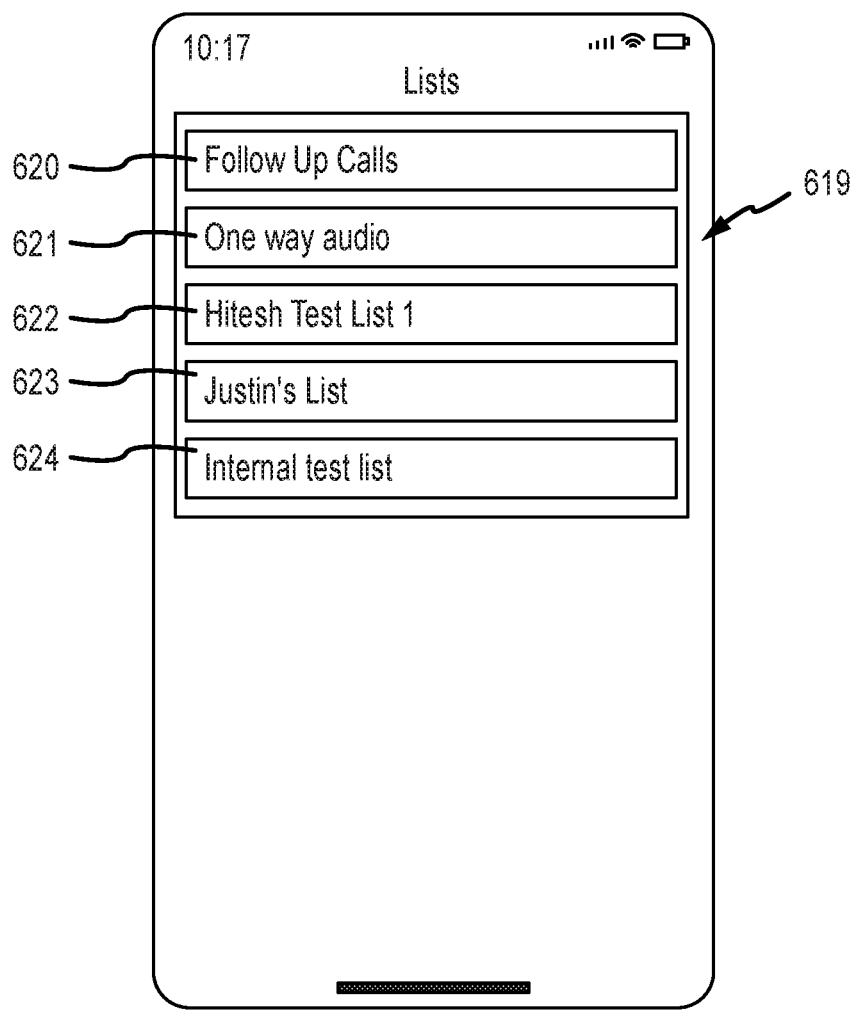
FIG. 18 is a screen display of a list of calling lists for a mobile application running on a wireless handheld computing device, such as a smartphone.

If the credential information establishes that the user 101 is authorized to access the communication link establishment and management system 100, the method 600 proceeds to step 602 shown in FIG. 14. As shown in FIG. 17, the mobile application 115 may display screen 617 to the user 101, in this example providing a message 618 indicating "Connecting to bridge . . . ", while a communication link is being established. When the mobile application 115 completes execution of step 602, a configurable selection of call lists 620, 621, 622, 623 and 624 is displayed on the wireless handheld computing device associated with the user 101, as indicated by the example screen 619 illustrated in FIG. 18. Each call list 620, 621, 622, 623 and 624 is associated with data for a selected group of targets 103 stored on the database 111. The user 101 may select a desired call list by pressing on the appropriate area 620, 621, 622, 623 or 624 of the screen 619, or by voice command.

Figure 19:
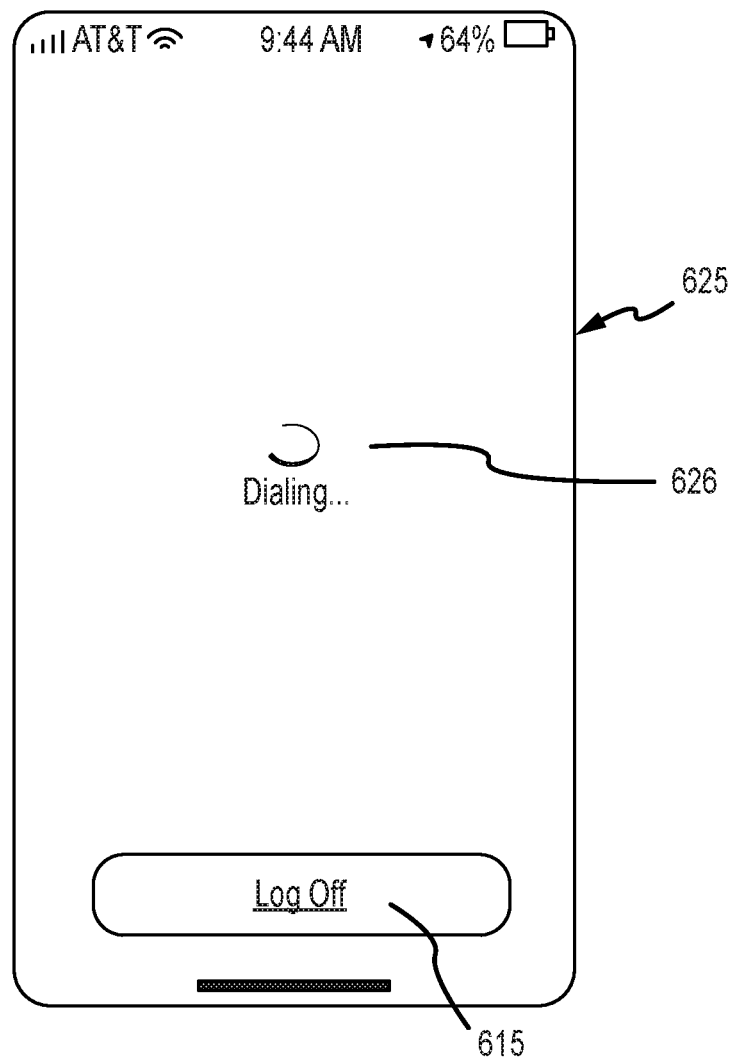
FIG. 19 is a screen display used for a mobile application while the communication link establishment and management system is attempting to establish a communication link with a target on a selected calling list.

Referring to FIG. 14, the method 600 proceeds to step 603, and system dialing is initiated for the selected call list 620, 621, 622, 623 or 624. The mobile application 115 may display a dialing screen 625 to the user 101, as illustrated in FIG. 19. In the illustrated example, the screen 625 provides a display of the message "Dialing . . . " 626 to the user 101. The user 101 may terminate the system dialing at any time by pressing the "Log Off" button 615 provided on the screen 625, or by voice command.

Figure 20:
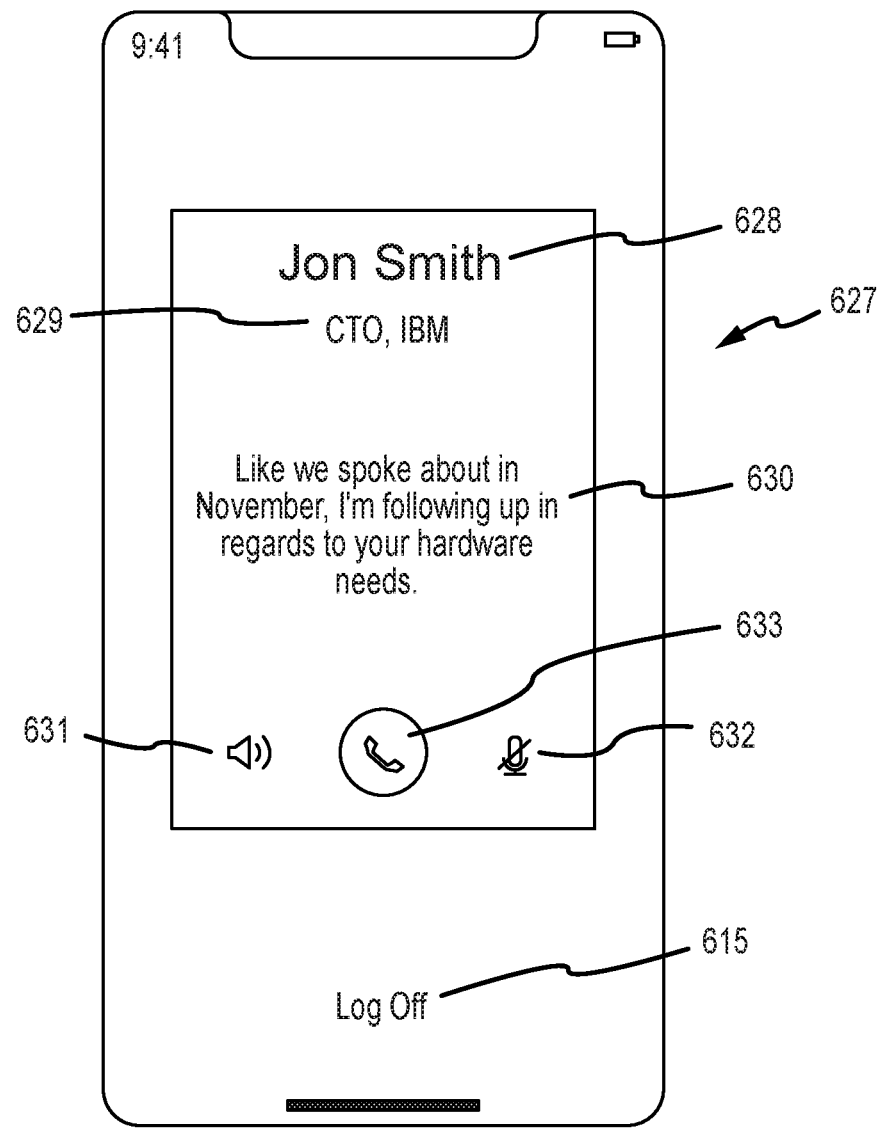
FIG. 20 is a screen display used for a mobile application when the communication link establishment and management system has established a communication link with a target on a selected calling list.

When a connection with a target 103 is established by the communication link establishment and management system 100, the mobile application 115 proceeds to step 604 in FIG. 14 and displays information concerning the connected target 103. An example of a display screen 627 is shown in FIG. 20. As described more fully above in connection with the operation of the communication link establishment and management system 100, an agent 102 is frequently involved in completing a connection with a target 103 on the selected calling list 620, 621, 622, 623 or 624. The user 101 does not waste his or her time dialing unsuccessful calls, or navigating automated attendants, or talking to receptionists, etc. In a fully navigated mode of operation, the user 101 will not be connected until the desired target 103 is on the line. Alternatively, in a connect-on-live-voice mode of operation, the user 101 may be connected as soon as any live human answers a called telephone number. A connection is established with the user 101 when a successful connection is made with a target 103, or a live human, depending on the mode of operation, and the user 101 does not necessarily know in advance which target 103 he or she may be connected to next. When a connection is established, the communication link establishment and management system 100 transmits to the mobile application 115 information associated with the connected target 103. This may include contact information retrieved from the database 111, and also support information retrieved from a CRM system 501, 502 or 503.

In order to facilitate a conversation, the screen 627 displays the name 628 of the target 103 and his or her job title and company 629 (i.e., target identifying information), as shown in FIG. 20. Optionally, the name of the target 103 may be pronounced correctly for the user 101 by synthesized voice or by playing a recorded voice. Support information 630 retrieved from a CRM system 501, 502 or 503 may be displayed concerning prior conversations or the status of any dealings with the associated target 103. As shown in FIG. 20, identifying information and support information 630 may be displayed on a portion of display screen 627 that takes up a majority of display screen 627. In a preferred embodiment, a convenient speaker button 631 is provided to place the phone on speaker, and a convenient mute button 632 is provided to mute the phone. When the conversation is completed, the user 101 may disconnect the call by pressing a hang-up button 633, as illustrated in FIG. 20. Alternatively, voice command may be used to disconnect a call. The dialing session may be interrupted at any time by activating the "Log Off" button shown in FIG. 20.

Figure 21:
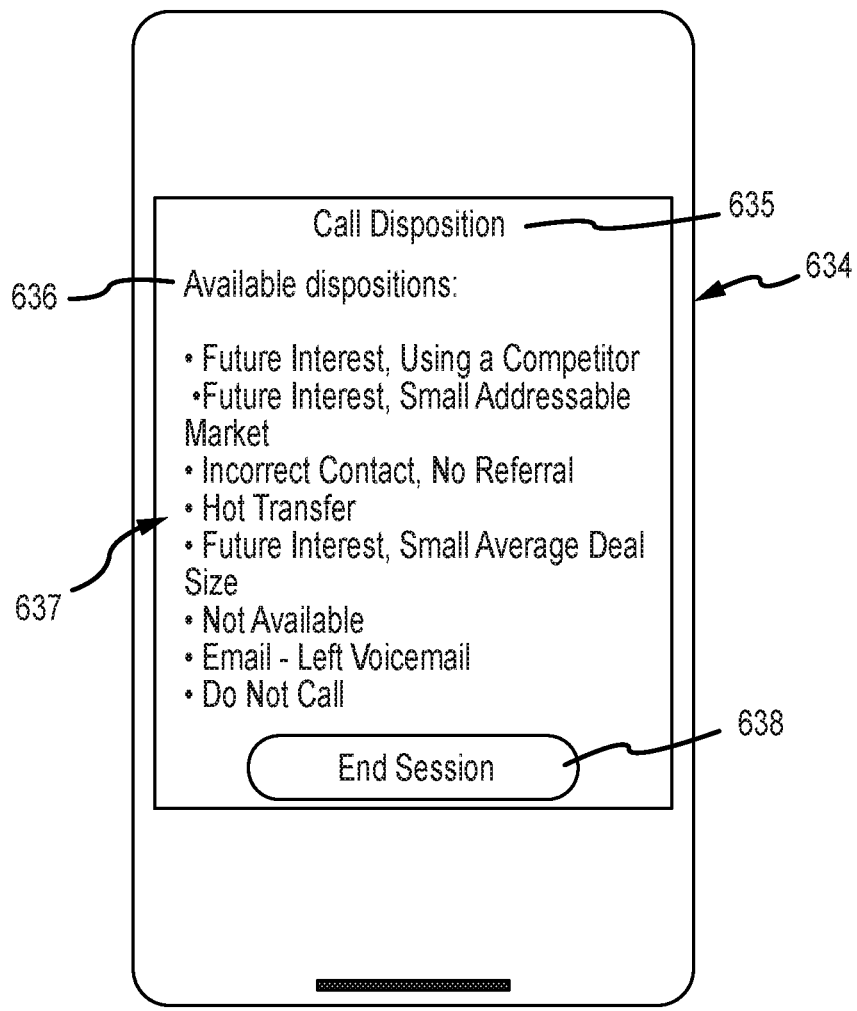
FIG. 21 is a screen display used for a mobile application for displaying, on a wireless handheld computing device such as a smartphone, a plurality of predetermined call dispositions after the communication connection with a target has been completed.

When a conversation between the user 101 and the target 103 is finished, the mobile application 115 proceeds to step 605 shown in FIG. 14 and prompts the user 101 to enter data indicating the disposition 635 of the conversation with the target 103. Preferably, the prompt includes a voice prompt to the user 101. In a preferred embodiment, the user 101 is provided with a call wrap-up screen 634 of a configurable set of call dispositions 637, as shown in FIG. 21. Call wrap-up screen 634 may take up a majority of display screen 627. In the illustrated example, a scroll-down list of call dispositions 637 is displayed on disposition screen 634 under a heading of "Available dispositions" 636. The list of available dispositions is preferably obtained from the CRM system 501, 502 or 503.

Examples of call dispositions may include: "Interest, Send Information"; "Using Competitor"; "Future Interest, Using a Competitor"; "Referral"; "Future Interest, Small Addressable Market"; "Meeting Scheduled, CEO/VP, Qualified Opp"; "Email—Interest, Send Information"; "Prospect Hung Up"; "Email—Left Voicemail"; "Meeting Scheduled, Executive Meeting"; "Meeting Scheduled—BreakThrough Script"; "Incorrect Contact, No Referral"; "Meeting Scheduled"; "Meeting Rescheduled by SDR"; "Take me off your list"; "Busy, Call Back Later"; "Interest, Call Back Later"; "Meeting Scheduled, CEO Meeting, Funded Company"; "No Current Interest, Follow-up Later"; "Email—Busy, Call Back Later"; "Current Customer"; "Future Interest, Follow-Up Later"; "No Interest, Reason Given"; "Meeting Rescheduled"; "Future Interest, Small Average Deal Size"; "No Interest, No Reason Given"; "Future Interest, Early Stage Startup"; "Too small".

Figure 22:
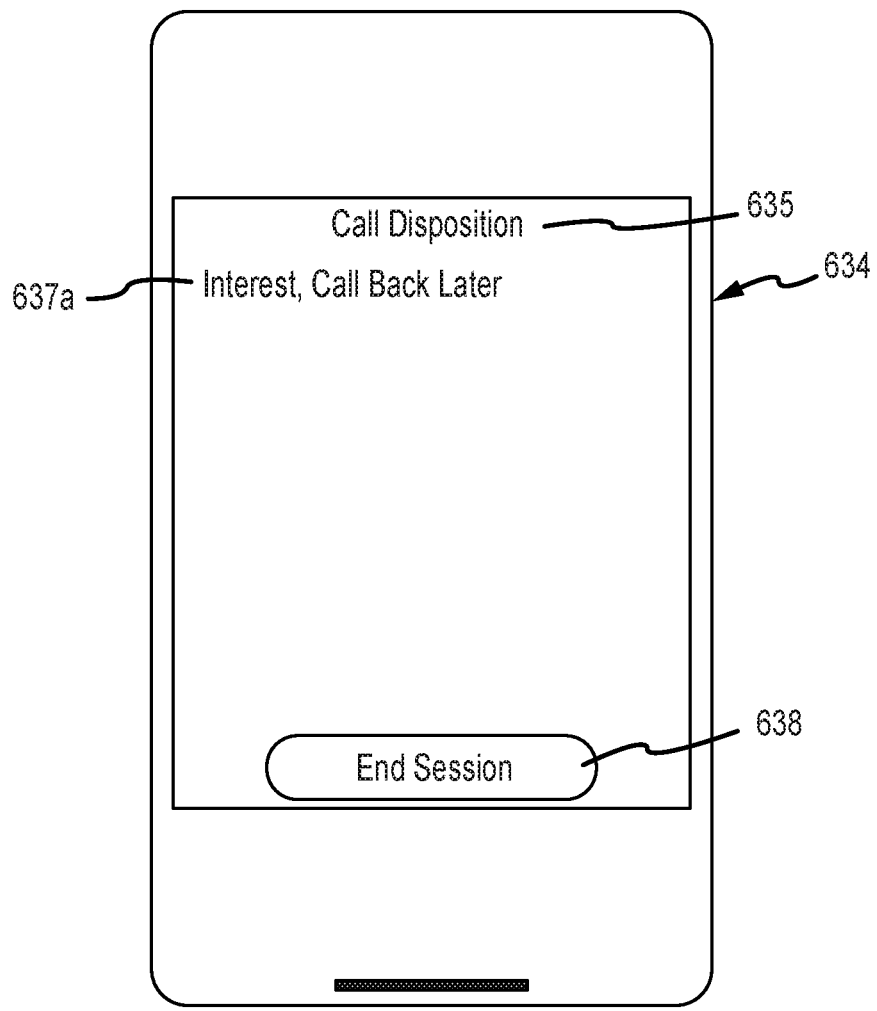
FIG. 22 is a screen display used for a mobile application for displaying, on a wireless handheld computing device such as a smartphone, a call disposition selected by the user.

The user 101 selects a call disposition from the list 637. The mobile application 115 will display the selected call disposition information on the wrap-up screen 634, as shown in FIG. 22. For example, FIG. 22 shows an instance where the user 101 determined during the conversation that the target 103 was interested, resulting in a call disposition of "Interest, Call Back Later." The selected call disposition information may be transmitted by the mobile application 115 to the communication link establishment and management system 100 to be stored in the database 111, and/or to be transmitted to the CRM system 501, 502 or 503.

Figure 23:
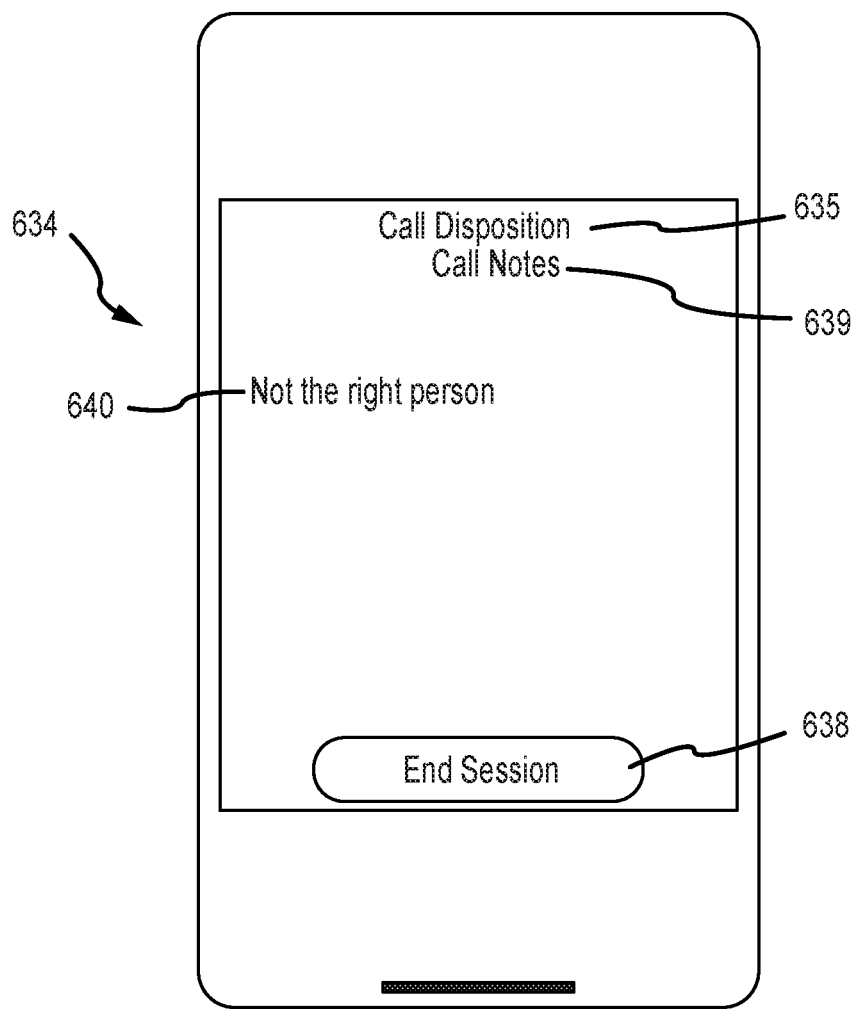
FIG. 23 is an example of a screen display used for a mobile application for displaying, on a wireless handheld computing device such as a smartphone, call notes entered by the user after the communication connection with a target has been completed.
Figure 24:
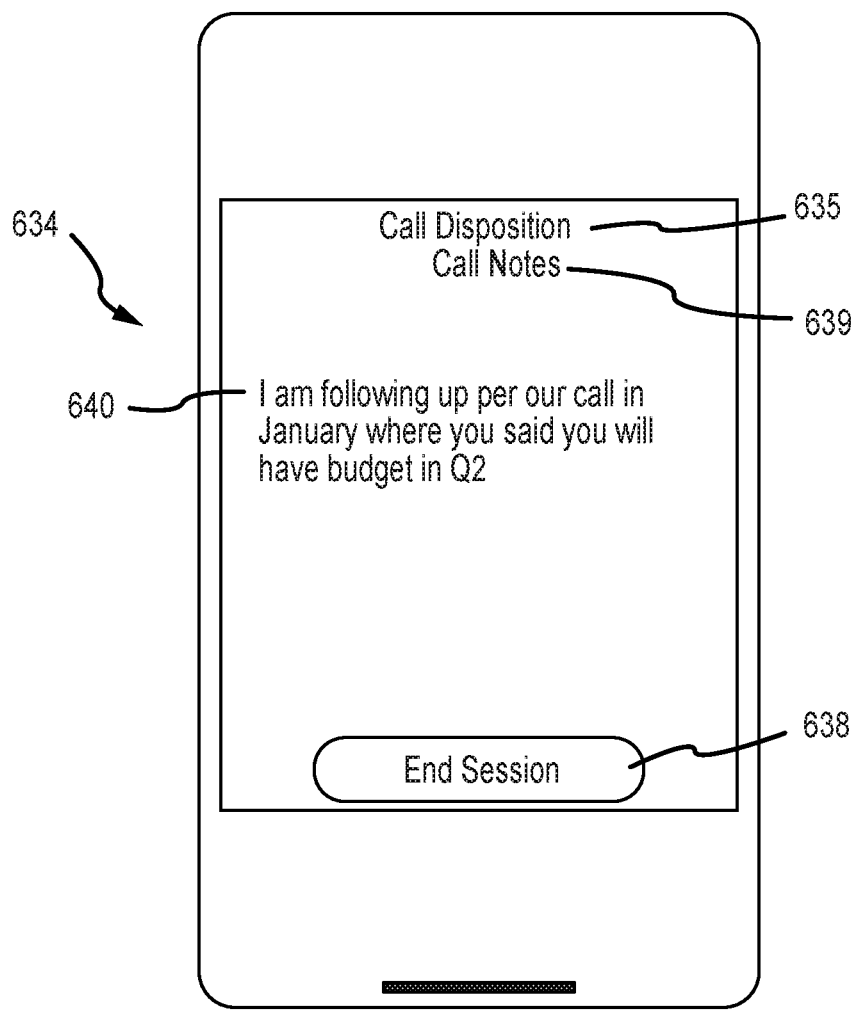
FIG. 24 is another example of a screen display used for a mobile application for displaying, on a wireless handheld computing device such as a smartphone, call notes entered by the user after the communication connection with a target has been completed, illustrating a script to be used in a future call with the same target.
Figure 25:
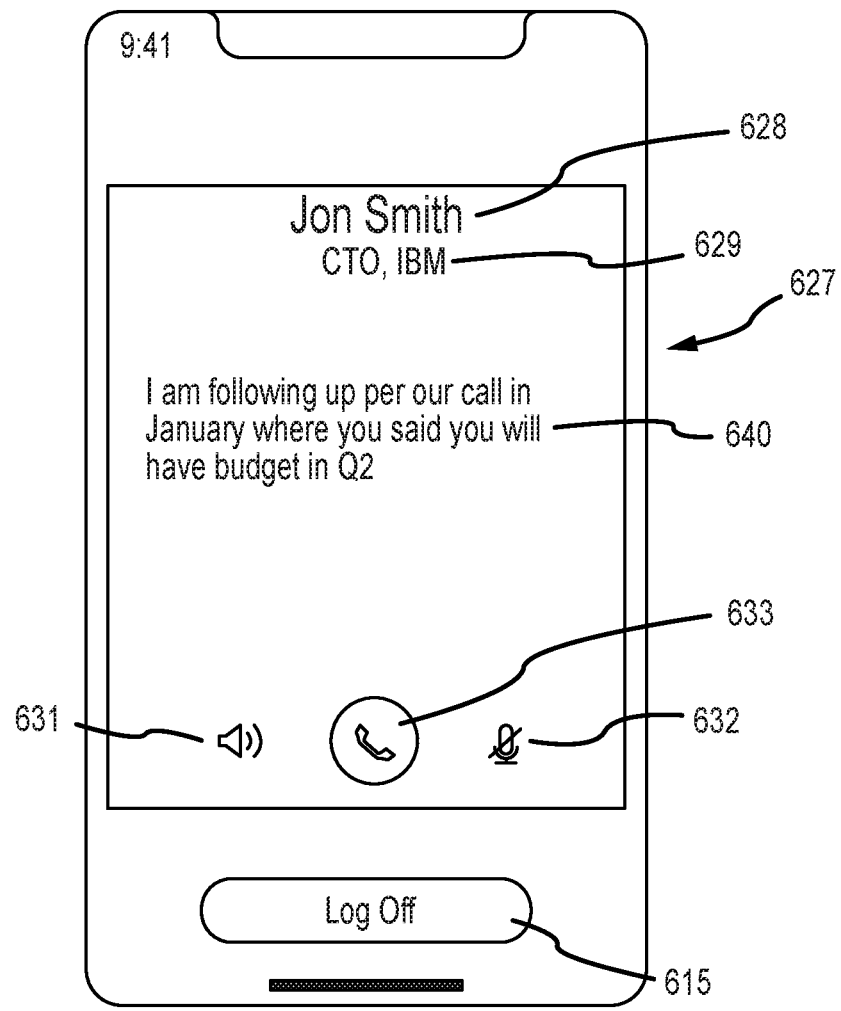
FIG. 25 is a screen display used for a mobile application for displaying, on a wireless handheld computing device such as a smartphone, notes to be used as a script when the communication link establishment and management system has established a subsequent communication link with the same target, on a future calling list, involved in the call illustrated in FIG. 24.

In step 606, the mobile application 115 then prompts the user 101 to enter call notes 639 concerning the conversation. This may include a voice prompt to the user 101. FIG. 23 is an example of the wrap-up screen 634 where the user 101 determined in the conversation that the target 103 was not the right person with authority to make a purchase decision, and the user 101 has entered the note "Not the right person" 640. The opportunity to enter call notes 639 provides significant advantages in facilitating a subsequent conversation with the same target 103. The user 101 can use the call notes 639 to write a script 640 to be used in a possible subsequent conversation with the same target 103. For example, FIG. 24 illustrates an instance of the wrap-up screen 634 where the user 101 has entered the note 640 as follows: "I am following up per our call in January where you said you will have budget in Q2." FIG. 25 illustrates how this call note 640 shown in FIG. 24 is later used in a future calling session. In a future calling session, when a connection is made to this same target 103, the communication link establishment and management system 100 will retrieve this note 640 from the CRM system 501, 502 or 503, and display the information in step 604, as shown in FIG. 25.

Figure 26:
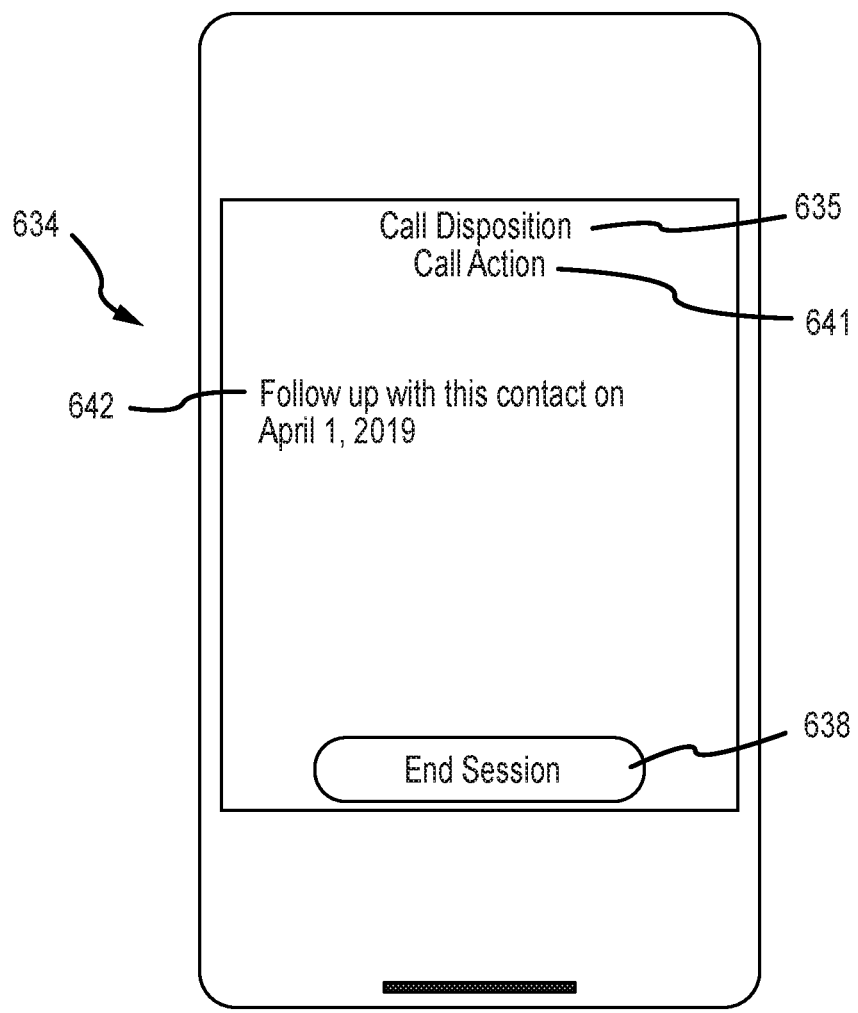
FIG. 26 is an example of a screen display used for a mobile application for displaying, on a wireless handheld computing device such as a smartphone, a specified date based upon a selected call disposition, to be used by the computer-based system to generate a hold flag associated with the target in a database associated with a customer relationship management system, wherein the hold flag indicates that the target should not be contacted prior to the specified date.

After entering call notes 640, the wrap-up screen 634 will complete step 606 by executing a follow up teleprompter to display a screen 634 to indicate a call action 641 associated with this target 103 as a result of this conversation. This is an optional follow up task to make sure any future call attempts are made after a selected time interval, for example. In the example illustrated in FIG. 26, the call action 641 is shown as "Follow up with this contact on Apr. 1, 2019", as indicated by reference numeral 642. The mobile application 115 allows the user 101 to select a follow up date for a future conversation, to select a time interval that must elapse before the target 103 is included in a subsequent call list. Step 606 provides a powerful tool for informing any follow-up call attempts made to the same target 103 of the disposition of the current conversation, to help start the next conversation as a continuation of this prior conversation.

Figure 27:
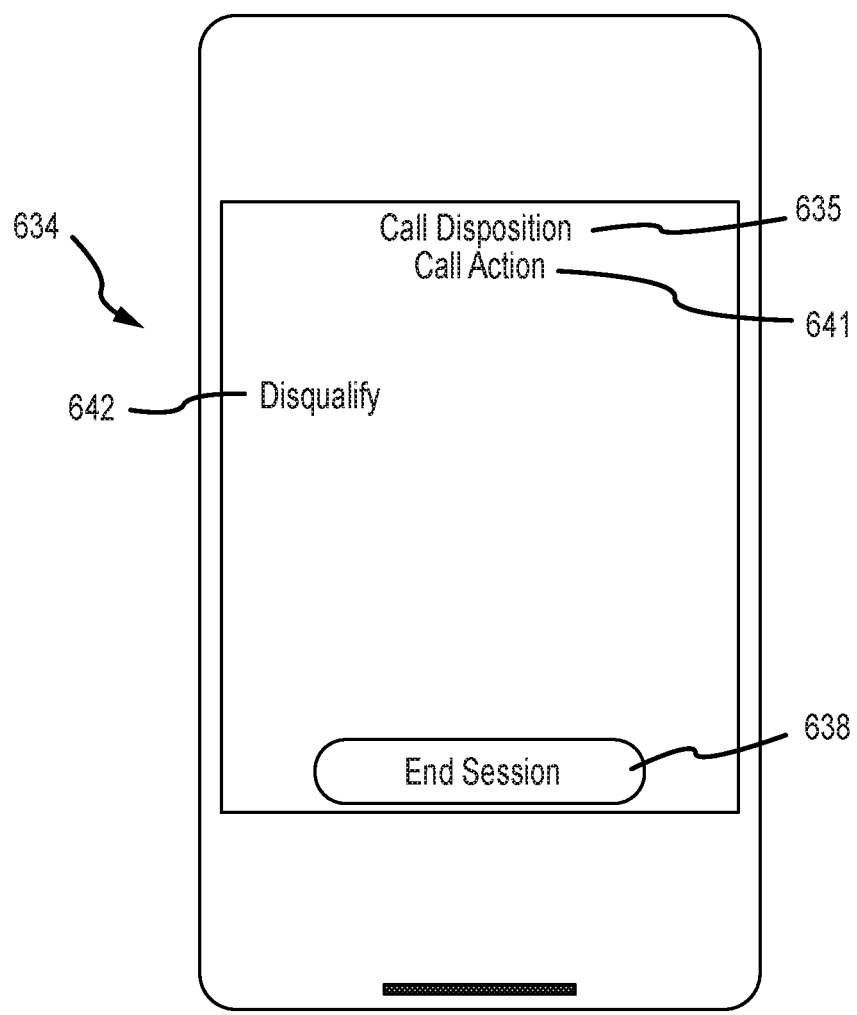
FIG. 27 is an example of a screen display used for a mobile application for displaying, on a wireless handheld computing device such as a smartphone, a call action.

Alternatively, if the user 101 determined in a conversation that the target 103 was not the right person with authority to make a purchase decision, (see the note shown in FIG. 23), in that example the call action 641 might be "Disqualify" as shown in FIG. 27.

The method proceeds to step 607 to dispose of the call in the system. The data entered for call disposition 635, call notes 639, and follow up call action 641, is transmitted to the communication link establishment and management system 100 for storage in the database 111, and to the CRM system 501, 502 or 503, for storage. As shown in FIG. 14, the system operates in a loop, and loops from step 607 back to step 603 to initiate a call to another target 103 on the selected call list. The communication link establishment and management system 100 will continue to further dialing on the selected list after each conversation is completed. The user 101 may end the session by pressing an "end session" button 638 provided on the wrap-up screen 634. The system will continue looping back and dialing more targets 103 on the selected list until a command is received to stop calling, either by logging off of the mobile application 115, or by terminating or pausing the calling session.

When a user 101 uses the mobile application 115 on a smartphone to make calls to a target 103, the communication link between the smartphone 115 and the communication link establishment and management system 100 typically does not employ the public switched telephone network ("PSTN"). For purposes of the mobile application 115, communication between the user's smartphone 115 and the communication link establishment and management system 100 is over an Internet connection employing TCP/IP protocol, and voice is transmitted over the link as digital packets. If a user 101 initially establishes a conversation with a target 103 while the user's smartphone is connected via a WiFi connection, but then travels out of range of the WiFi network during the conversation, the communication link should seamlessly switch to a cellular connection and maintain the conversation without interruption. But under such circumstances, the cellular connection will be used as an Internet connection to the communication link establishment and management system 100. From the perspective of the user 101, and the target 103, the conversation typically will appear no different than a conversation via a cellular telephone call made via the PSTN. This functionality takes advantage of the capabilities of a smartphone, and also enables a user 101 to employ any typical wireless handheld computing device for the mobile application 115. For example, a tablet that has a WiFi connection, but is not capable of making cellular telephone calls, may be used to run the mobile application 115 in accordance with the present invention.

A web application 116 may also be provided for a user 101 to conveniently access the communication link establishment and management system 100 using a web browser running on a personal computer. In a preferred embodiment, the web application 116 uses a REST API for interfacing with the communication link establishment and management system 100, employing the JSON format for exchanging information with the communication link establishment and management system 100. As explained above, the mobile application 115 uses an Internet connection between the user 101 and the communication link establishment and management system 100. Thus, the web application 116 will advantageously use the same functionality employed by the mobile application 115 described above. As long as the user's web browser running on a personal computer has an Internet connection available for communication with the communication link establishment and management system 100, the function and operation of the web application 116 in accordance with a present embodiment will be essentially as described above in connection with the mobile application 115.

The illustrated example described herein may be employed in one embodiment. However, one skilled in the art will understand that any of a plurality of embodiments may be utilized to perform the methods described herein. For example, FIG. 1 shows six agents 102. However, it should be understood that the number of agents 102 is arbitrary, and any number of agents 102 may be used in connection with the communication link establishment and management system 100. Similarly, the example shown in FIG. 1 has five users 101. However, it should be understood that the number of users 101 is arbitrary, and any number of users 101 may be used in connection with the communication link establishment and management system 100. Further, any number of targets 103 may be simultaneously contacted by the communication link establishment and management system 100, and the invention is not limited to the number of targets shown in the illustrated example of FIG. 1.

The term "communication link" as used herein may be defined broadly to include any channel of communication between two or more persons. In the context of this description, a "communication link", in addition to the examples cited herein, may be a wireless data connection, a radio transmission, a satellite connection, a VoIP connection, a television or video connection, a connection via the PSTN, or any data path or communication channel that permits a conversation to take place between a user and a target.

Those of ordinary skill will also understand that the various illustrative logical blocks, modules, and algorithm steps described in connection with the examples disclosed herein may be implemented as electronic hardware, computer software, or combinations of both. Furthermore, the present invention can also be embodied on a machine-readable medium causing a processor or computer to perform or execute certain functions. A preferred embodiment of the invention may advantageously use a smartphone, for convenience and portability, but any wireless handheld computing device may be employed, including a tablet.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in tangible, non-transitory memory such as RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a user device, or a wireless handheld computing device, such as a smartphone. In the alternative, the processor and the storage medium may reside as discrete components in a user device, or a wireless handheld computing device, such as a smartphone.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for automatically calling targets on a calling list using a smartphone comprising a display screen to control a computer-based communication link establishment and management system, comprising the steps of:

selecting through a mobile application on the smartphone, from a plurality of calling lists stored on a computer-based system, a desired calling list of targets for an attempted communication, using the mobile application to transmit the selection to the computer-based communication link establishment and management system in communication with the mobile application, wherein the selecting the desired call list of targets is able to be completed via at least one of a touchscreen calling list button or a physical calling list button, and via a calling list voice command;

automatically attempting, by the computer-based communication link establishment and management system, to selectively establish a communication connection with targets included on a selected calling list, with an agent associated with the communication link establishment and management system optionally functioning to facilitate the establishment of a communication connection with the targets;

establishing, by the computer-based communication link establishment and management system, a communication connection between the smartphone and a target included on the selected calling list;

transmitting, from the computer-based communication link establishment and management system to the mobile application, identifying information and support information associated with the target for display through the mobile application on the smartphone, wherein the identifying information and the support information is displayed on a portion of the display screen of the smartphone that takes up a majority of the display screen;

receiving a selection, from a plurality of predetermined call dispositions stored on the computer-based system, of a call disposition to be transmitted from the mobile application to the computer-based communication link establishment and management system, after the communication connection is completed, wherein the plurality of predetermined call dispositions is displayed on a call wrap-up screen in the display screen from which the call disposition is selected, wherein the call wrap-up screen takes up a majority of the display screen, wherein the selecting the call disposition is able to be completed via at least one of a touchscreen call disposition button or a physical call disposition button, and via a call disposition voice command;
inputting notes into the mobile application concerning the target, after the communication connection is completed;
automatically updating, by the computer-based system, information for the target, comprising the steps of:
transmitting, from the mobile application to the computer-based communication link establishment and management system, selected call disposition information, and notes concerning communication with the target; and
storing, by the computer-based system, the selected call disposition information and the notes, in a database associated with a customer relationship management system;
automatically attempting, by the computer-based communication link establishment and management system, to selectively establish a communication connection with another target included on the selected calling list; and
repeating the steps of the method until the computer-based communication link establishment and management system receives a termination signal from the smartphone.

2. The method for automatically calling targets on a calling list using a smartphone to control a computer-based communication link establishment and management system according to claim 1, further comprising the steps of:
selecting, by the computer-based system, a specified date based upon the selected call disposition, wherein the selecting the specified date is able to be completed via at least one of a touchscreen date button or a physical date button, and via a date voice command;
storing, by the computer-based system, a hold flag associated with the target in the database associated with the customer relationship management system, wherein the hold flag indicates that the target should not be contacted prior to the specified date; and
permitting, by the computer-based system, the target to be contacted, in response to a current date being after the specified date.

3. The method for automatically calling targets on a calling list using a smartphone to control a computer-based communication link establishment and management system according to claim 2, further comprising the step of:
excluding, by the computer-based system, the target from a new selected calling list based on the hold flag.

4. The method for automatically calling targets on a calling list using a smartphone to control a computer-based communication link establishment and management system according to claim 1, wherein:
said notes comprise a script for a future communication with a target based upon the results of a conversation with the target during the communication connection.

5. The method for automatically calling targets on a calling list using a smartphone to control a computer-based communication link establishment and management system according to claim 1, further comprising:
delivering, by the mobile application, an audible indicator of the established communication connection between the smart phone and the target in response to establishing the communication connection.

6. The method for automatically calling targets on a calling list using a smartphone to control a computer-based communication link establishment and management system according to claim 5, wherein the delivering the audible indicator comprises audibly delivering at least one of the identifying information or the support information associated with the target.

7. The method for automatically calling targets on a calling list using a smartphone to control a computer-based communication link establishment and management system according to claim 1, wherein the identifying information and the support information associated with the target is displayed automatically on the majority of the display screen when the communication connection between the smartphone and the target is established.

8. A system for automatically calling targets on a calling list using a smartphone comprising a display screen to control a computer-based communication link establishment and management system, comprising:
a mobile application on the smartphone in communication with the computer-based communication link establishment and management system;
a calling list selector allowing selection, from a plurality of calling lists stored on a computer-based system, of a desired calling list of targets for an attempted communication, using the mobile application to transmit the selection to a computer-based communication link establishment and management system, wherein the calling list selector comprises at least one of a touchscreen calling list button or a physical calling list button, and a calling list voice command;
means for automatically attempting, by the computer-based communication link establishment and management system, to selectively establish a communication connection with targets included on a selected calling list, with an agent associated with the communication link establishment and management system optionally functioning to facilitate the establishment of a communication connection with the targets;
means for establishing, by the computer-based communication link establishment and management system, a communication connection between the smartphone and a target included on the selected calling list;
means for transmitting, from the computer-based communication link establishment and management system to the mobile application, identifying information and support information associated with the target for display through the mobile application on the smartphone, wherein the identifying information and the support information is displayed on a portion of the display screen of the smartphone that is a majority of the display screen;
a call disposition selector allowing selection, from a plurality of predetermined call dispositions stored on the computer-based system, of a call disposition to be transmitted from the mobile application to the computer-based communication link establishment and management system, after the communication connection is completed, wherein the plurality of predetermined call dispositions is displayed on a call wrap-up screen in the display screen from which the call disposition is selected, wherein the call wrap-up screen takes up a majority of the display screen, wherein the call disposition selector comprises at least one of a touchscreen call disposition button or a physical call disposition button, and a call disposition voice command;

means for inputting notes into the mobile application concerning the target, after the communication connection is completed;

means for automatically updating, by the computer-based system, information for the target, comprising:
- means for transmitting, from the mobile application to the computer-based communication link establishment and management system, selected call disposition information, and notes concerning communication with the target; and
- means for storing, by the computer-based system, the selected call disposition information and the notes, in a database associated with a customer relationship management system;

means for automatically attempting, by the computer-based communication link establishment and management system, to selectively establish a communication connection with another target included on the selected calling list; and means for repeating the steps of the method until the computer-based communication link establishment and management system receives a termination signal from the smartphone.

9. The system for automatically calling targets on a calling list using a smartphone to control a computer-based communication link establishment and management system according to claim 8, further comprising:
- a date selector allowing selection, by the computer-based system, of a specified date based upon the selected call disposition, wherein date selector comprises at least one of a touchscreen date button or a physical date button, and a date voice command;
- means for storing, by the computer-based system, a hold flag associated with the target in the database associated with the customer relationship management system, wherein the hold flag indicates that the target should not be contacted prior to the specified date; and
- means for permitting, by the computer-based system, the target to be contacted, in response to a current date being after the specified date.

10. The system for automatically calling targets on a calling list using a smartphone to control a computer-based communication link establishment and management system according to claim 9, further comprising:
- means for excluding, by the computer-based system, the target from a new selected calling list based on the hold flag.

11. The system for automatically calling targets on a calling list using a smartphone to control a computer-based communication link establishment and management system according to claim 8, wherein the mobile application is configured to deliver an audible indicator of the established communication connection between the smart phone and the target in response to establishing the communication connection.

12. The system for automatically calling targets on a calling list using a smartphone to control a computer-based communication link establishment and management system according to claim 11, wherein the audible indicator comprises an audible delivery of at least one of the identifying information or the support information associated with the target.

13. The system for automatically calling targets on a calling list using a smartphone to control a computer-based communication link establishment and management system according to claim 8, wherein the identifying information and the support information associated with the target is displayed automatically by the mobile application on the majority of the display screen when the communication connection between with the smartphone and the target is established.

* * * * *